United States Patent
Han et al.

(10) Patent No.: US 12,086,654 B2
(45) Date of Patent: Sep. 10, 2024

(54) PARALLEL PROCESSING UNIT VIRTUALIZATION

(71) Applicant: T-Head (Shanghai) Semiconductor Co., Ltd., Shanghai (CN)

(72) Inventors: Liang Han, Campbell, CA (US); Guoyu Zhu, San Jose, CA (US); ChengYuan Wu, Fremont, CA (US); Rong Zhong, Fremont, CA (US)

(73) Assignee: T-Head (Shanghai) Semiconductor Co., Ltd., Shanghai (CN)

( * ) Notice: Subject to any disclaimer, the term of this patent is extended or adjusted under 35 U.S.C. 154(b) by 442 days.

(21) Appl. No.: 17/477,446

(22) Filed: Sep. 16, 2021

(65) Prior Publication Data

US 2023/0090604 A1    Mar. 23, 2023

(51) Int. Cl.
*G06F 9/455* (2018.01)
*G06F 9/48* (2006.01)
*G06F 9/52* (2006.01)

(52) U.S. Cl.
CPC ............ *G06F 9/52* (2013.01); *G06F 9/45558* (2013.01); *G06F 9/4856* (2013.01); *G06F 2009/4557* (2013.01)

(58) Field of Classification Search
CPC .............................. G06F 9/5038; G06F 9/5066
See application file for complete search history.

(56) References Cited

U.S. PATENT DOCUMENTS

| | | |
|---|---|---|
| 5,794,016 A | 8/1998 | Kelleher |
| 5,895,489 A | 4/1999 | Hammond et al. |
| 5,933,844 A | 8/1999 | Young |
| 6,233,667 B1 | 5/2001 | Shaylor et al. |
| 6,243,863 B1 | 6/2001 | Kothari et al. |
| 6,412,043 B1 | 6/2002 | Chopra et al. |
| 6,604,188 B1 | 8/2003 | Coon et al. |
| 6,967,745 B1 | 11/2005 | Konno et al. |
| 7,015,913 B1 | 3/2006 | Lindholm et al. |
| 7,395,388 B2 * | 7/2008 | Sugiura ................... G06F 3/067 711/147 |
| 7,454,749 B2 * | 11/2008 | Oberdorfer ........... G06F 9/5066 718/1 |
| 7,522,167 B1 | 4/2009 | Diard et al. |
| 7,627,723 B1 | 12/2009 | Buck et al. |
| 8,321,849 B2 * | 11/2012 | Nickolls ................. G06F 8/456 717/146 |
| 8,484,648 B2 * | 7/2013 | Divirgilio ............. G06F 9/4818 718/103 |

(Continued)

*Primary Examiner* — Andy Ho

(57) ABSTRACT

Virtualization techniques can include determining virtual function routing tables for the virtual parallel processing units (PPUs) from a logical topology of a virtual function. A first mapping of the virtual PPUs to a first set of a plurality of physical PPUs can be generated. Virtualization can also include generating a first set of physical function routing tables for the first set of physical PPUs based on the virtual function tables and the first virtual PPU to physical PPU mapping. An application can be migrated from the first set of physical PPUs to a second set of PPUs by generating a second mapping of the virtual PPUs to a second set of a plurality of physical PPUs. A second set of physical function routing table for the second set of physical PPUs can also be generated based on the virtual function tables and the second virtual PPU to physical PPU mapping.

20 Claims, 17 Drawing Sheets

(56) References Cited

U.S. PATENT DOCUMENTS

| | | | |
|---|---|---|---|
| 8,654,634 B2 * | 2/2014 | Kendall | G06F 13/4273 |
| | | | 710/52 |
| 10,891,538 B2 | 1/2021 | Dally et al. | |
| 10,901,661 B2 | 1/2021 | Amidi et al. | |
| 11,244,420 B2 | 2/2022 | Vembu et al. | |
| 11,494,221 B2 | 11/2022 | Kumabe | |
| 2017/0235848 A1 | 8/2017 | Van Dusen et al. | |
| 2020/0210222 A1 | 7/2020 | Kumabe | |
| 2021/0192676 A1 | 6/2021 | Vembu et al. | |
| 2023/0040725 A1 * | 2/2023 | Javeri | G06F 15/80 |

* cited by examiner

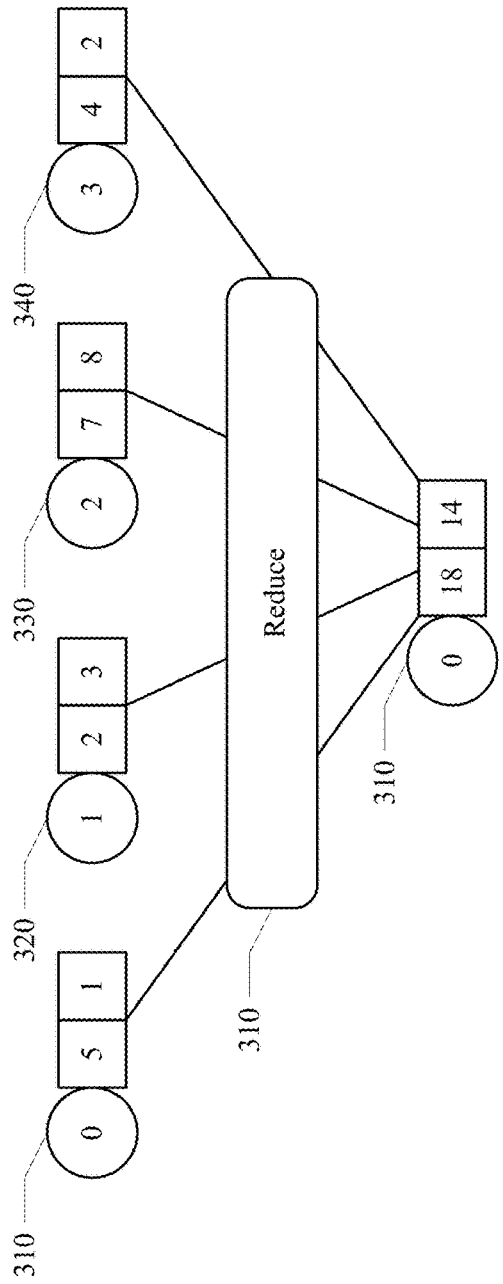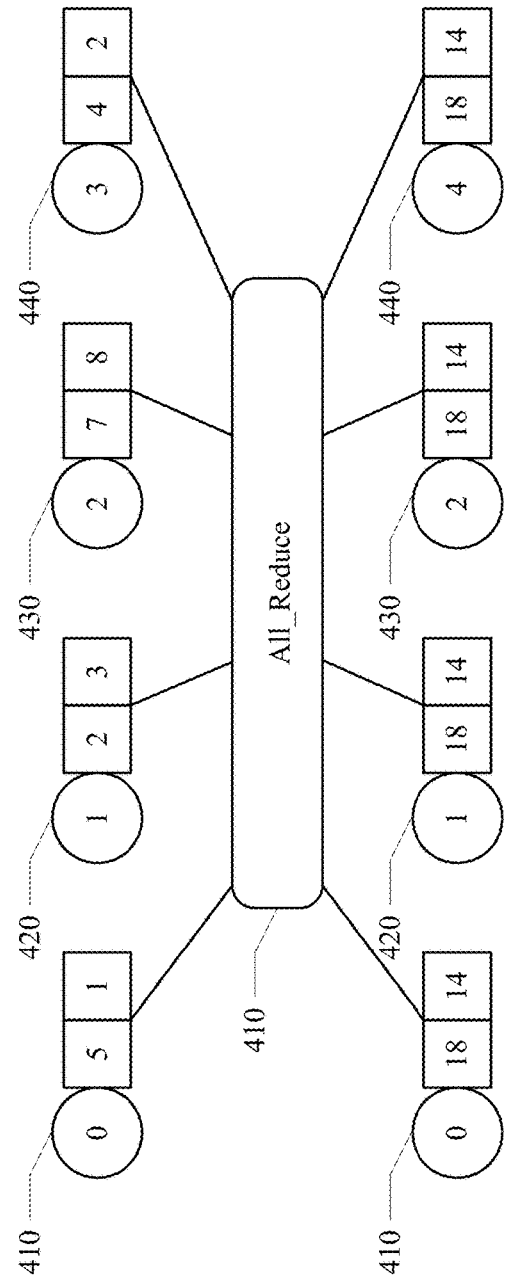
FIG. 3 (Conventional Art)
FIG. 4 (Conventional Art)

Deployment Phase

1405
Determine virtual parallel processing units (vPPUs) utilized by a virtual function (VF)

1410
Determine virtual function routing tables for the vPPUs from a logical topology of the virtual function (VF)

1415
Generate a first mapping of the vPPUs to a first set of a plurality physical parallel processing units (pPPUs)

1420
Generate a first set of physical function routing tables for the first set of pPPUs based on the virtual function tables and the first vPPU-pPPU mapping

---

Migration Phase

1425
Receive a migration event

1430
Generate a second mapping of the vPPUs to a second set of a plurality of pPPUs

1435
Generate second set of physical function routing tables for the second set of pPPUs based on the virtual function routing tables and the second vPPU-pPPU mapping

FIG. 14A

Deployment Phase

1805
Determine virtual parallel processing units (vPPUs) utilized by a virtual function (VF)

1810
Determine virtual function routing tables for the vPPUs from a logical topology of the virtual function (VF)

1815
Generate a first mapping of the vPPUs to a first set of physical parallel processing units (pPPUs)

1820
Generate a first set of physical function routing tables for the pPPUs based on the virtual function tables and the first vPPU-pPPU mapping

1825
Generate a first set of in-use routing tables for the pPPUs

1825
Executing an application using the first vPPU-pPPU mapping

Migration Phase

1830
Receive a migration event

PARALLEL PROCESSING UNIT VIRTUALIZATION

BACKGROUND OF THE INVENTION

A current methodology for parallel/distributed training of deep neural networks includes applying synchronized large minibatch stochastic gradient descent (SDG) processing on many distributed computing nodes to explore data parallel based acceleration. Referring to FIG. 1, an exemplary minibatch SDG process, including psuedo code, for running on a CPU host is illustrated. The process is subject to the synchronization parts bottlenecking the whole process of parallel acceleration. To reduce bottlenecking, building up the bandwidth of an accelerator-side network and/or reducing the frequency of host accelerator communication is needed, as illustrated in FIG. 2.

There are a number of algorithms for the synchronization of minibatch SDG processing. Some common inter-computing-note communication mode functions are the Reduce and All_Reduce functions. In the Reduce function, a set of values of each of a plurality nodes 310-340 are passed to a given one 310 of the plurality of nodes 310-340, which adds the respective values together, as illustrated in FIG. 3. The sum of the set of values is stored by the given node 310. For example, a first node 310 receives the values of 5, 2, 7 and 4 from the plurality of nodes 310-340, the first node adds the received values of 5, 2, 7 and 4 together, and the first node 310 stores the resulting sum of 18. The first node 310 also adds the values of 1, 3, 8 and 2 together and stores the resulting sum of 14. In the All_Reduce function, a set of values of each of a plurality of nodes 410-440 are passed to a given one 410 of the plurality of nodes 410-440, which adds the respective values together, as illustrated in FIG. 4. The set of sum values is broadcast by the given node 410 to the plurality of nodes 410-440, and the plurality of nodes 410-440 store the set of sum values. For example, a first node 410 adds the values of 5, 2, 7 and 4 received from the plurality of nodes 410-440 together. The first node 410 also adds the values of 1, 3, 8 and 2 together. The first node 410 broadcast the set of sum values of 18 and 14 to the plurality of nodes 410-440, which each store the set of sum values. As illustrated, the Reduce function and All_Reduce function are applied to a bunch of variables simultaneously.

Although a straightforward topology implementation of the Reduce and All_Reduce functions is a tree-based implementation, a ring-based implementation can achieve a higher bandwidth utilization rate and efficiency. Referring now to FIG. 5, a conventional ring-based All_Reduce implementation on a distributed computing system is illustrated. In the All_Reduce function, each of N nodes of a distributed computing system communicate with two of its peer nodes 2*(N−1) times. During the communications, a node sends and receives sets of values. In the first N−1 iterations, received values are added to the values in the respective nodes' buffers. In the second N−1 iterations, received values replace the values held in the respective nodes' buffers. For example, FIG. 5. illustrates three nodes (N=3) 510 each buffering a respective set of input values. In a first iteration 520, the first node passes a first set of input values to a second node. The second node adds the set of input values received from the first node to corresponding input values held by the second node. The first node also receives a third set of input values from a third node. The first node adds the set of input values received from the third node to corresponding values held by the first node. The second and third nodes also pass and add corresponding sets of input values in the first iteration 520. In a second iteration 530, the first node passes a third set of input values to the second node, which the second node adds to corresponding values held by the second node. The first node also receives a second set of values from the third node, which the first node adds to corresponding values held by the first node. The second and third nodes again pass and add corresponding sets of values in the second iteration 530. In a third iteration 540, the first node passes a second set of sum values to the second node, which the second node stores. The first node also receives a first set of sum values from the third node, which the first node stores. The second and third nodes also pass and store corresponding sets of the sum values. In a fourth iteration 550, the first node passes a first set of sum values to the second node, which the second node stores. The first node also received a third set of the sum values from the third node, which the first node stores. The second and third nodes also pass and store corresponding sets of the sum values. After the fourth iteration, each node has the set of sum values. If the buffer is large enough, the ring-based All_Reduce function illustrated in FIG. 5 can optimally utilize the available network of a distributed computing system.

Systems for computing the above Reduce and All_Reduce functions, in addition to numerous other functions, executing on a plurality of parallel processing units can benefit from virtualization and migration. However, there is a continuing need for improved virtualization and migration techniques for use with computing systems employing parallel processing topologies.

SUMMARY OF THE INVENTION

The present technology may best be understood by referring to the following description and accompanying drawings that are used to illustrate embodiments of the present technology directed toward parallel processing unit virtualization and migration.

In one embodiment, a parallel processing virtualization method can include determining virtual parallel processing units utilized by a virtual function. Virtual function routing tables can be determined for the virtual parallel processing units from a logical topology of the virtual function. The virtual parallel processing units can be mapped to a first set of physical parallel processing units. A first set of physical function routing tables for the first set of physical parallel processing units can be generated based on the virtual function routing tables and the mapping of the virtual parallel processing units to the first set of physical parallel processing units. The method can further include receiving a migration event. In response to the migration event, the virtual parallel processing units can be mapped to a second set of physical parallel processing units. A second set of physical function routing tables for the second set of physical parallel processing units can be generated based on the virtual function routing tables and the mapping of the virtual parallel processing units to the second set of physical parallel processing units. Data from the first set of physical parallel processing units can be migrated to the second set of physical parallel processing units based on the mapping of the virtual parallel processing units to the first set of physical parallel processing units and the mapping of the virtual parallel processing units to the second set of physical parallel processing units.

In another embodiment, a parallel processing virtualization method can include determining virtual parallel processing units utilized by a virtual function. Virtual function routing tables can be determined for the virtual parallel processing units from a logical topology of the virtual function. A first partition of a plurality of physical parallel processing units and be identified, and the virtual parallel processing units can be mapped to a first set of physical parallel processing units in the first partition. A first set of physical function routing tables including indications of in-use communication links for the first set of physical parallel processing units can be determined based on the virtual function routing tables and the mapping of the virtual parallel processing units to the first set of physical parallel processing units. Thereafter, an application can be executed on the first set of physical parallel processing units using the mapping of the virtual parallel processing units to the first set of physical parallel processing units, and the first set of physical function routing tables including indications of in-use communication links. In response to a migration event, a second partition of a plurality of parallel processing units can be identified. The virtual parallel processing units can be mapped to a second set of physical parallel processing units in the second partition. A second set of physical function routing tables including indication of in-use communication links for the second set of physical parallel processing units can be generated based on the virtual function routing tables and the mapping of the virtual parallel processing units to the second set of physical parallel processing units. Data can then be migrated from the first set of physical parallel processing units to the second set of physical parallel processing units based on the mapping of the virtual parallel processing units to the first set of physical parallel processing units and the mapping of the virtual parallel processing units to the second set of physical parallel processing units. Thereafter, the application can be executed on the second set of physical parallel processing units using the mapping of the virtual parallel processing units to the second set of physical parallel processing units, and the second set of physical function routing tables including indications of in-use communication links.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIG. 3 illustrates computation of a Reduce function according to the conventional art.

FIG. 4 illustrates computation of an All_Reduce function according to the conventional art.

FIGS. 14A and 14B shows a method of PPU virtualization for migration, in accordance with aspects of the present technology.

FIGS. 18A and 18B shows a method of parallel processing unit (PPU) virtualization for migration, in accordance with aspects of the present technology.

DETAILED DESCRIPTION OF THE INVENTION

Figure 1:
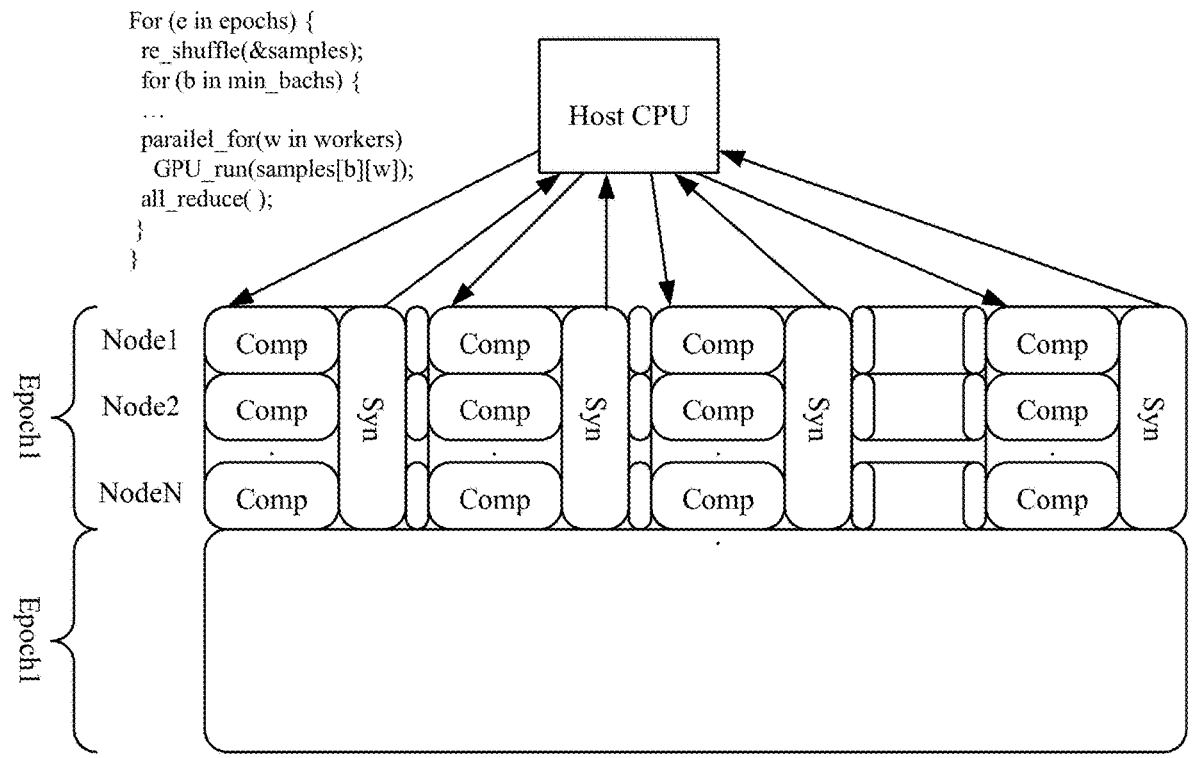
FIG. 1 shows an exemplary minibatch SDG process in accordance with the conventional art.
Figure 2:
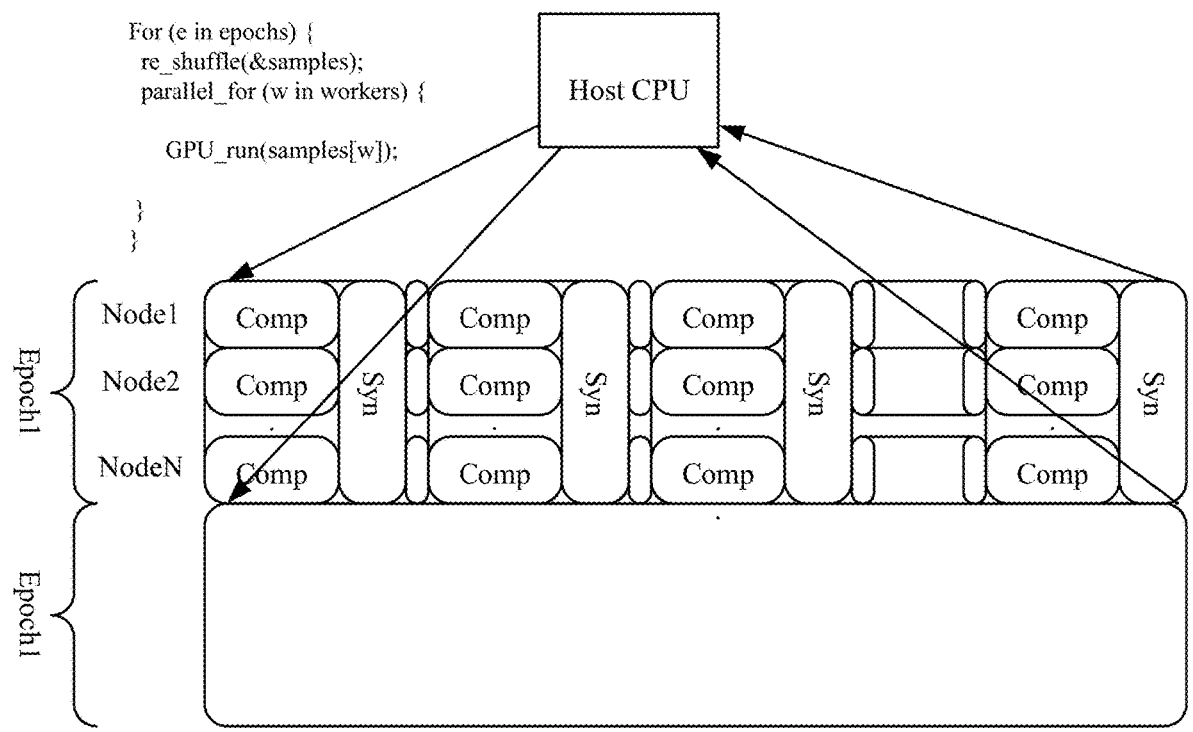
FIG. 2 shows another exemplary minibatch SDG process according to the conventional art.
Figure 5:
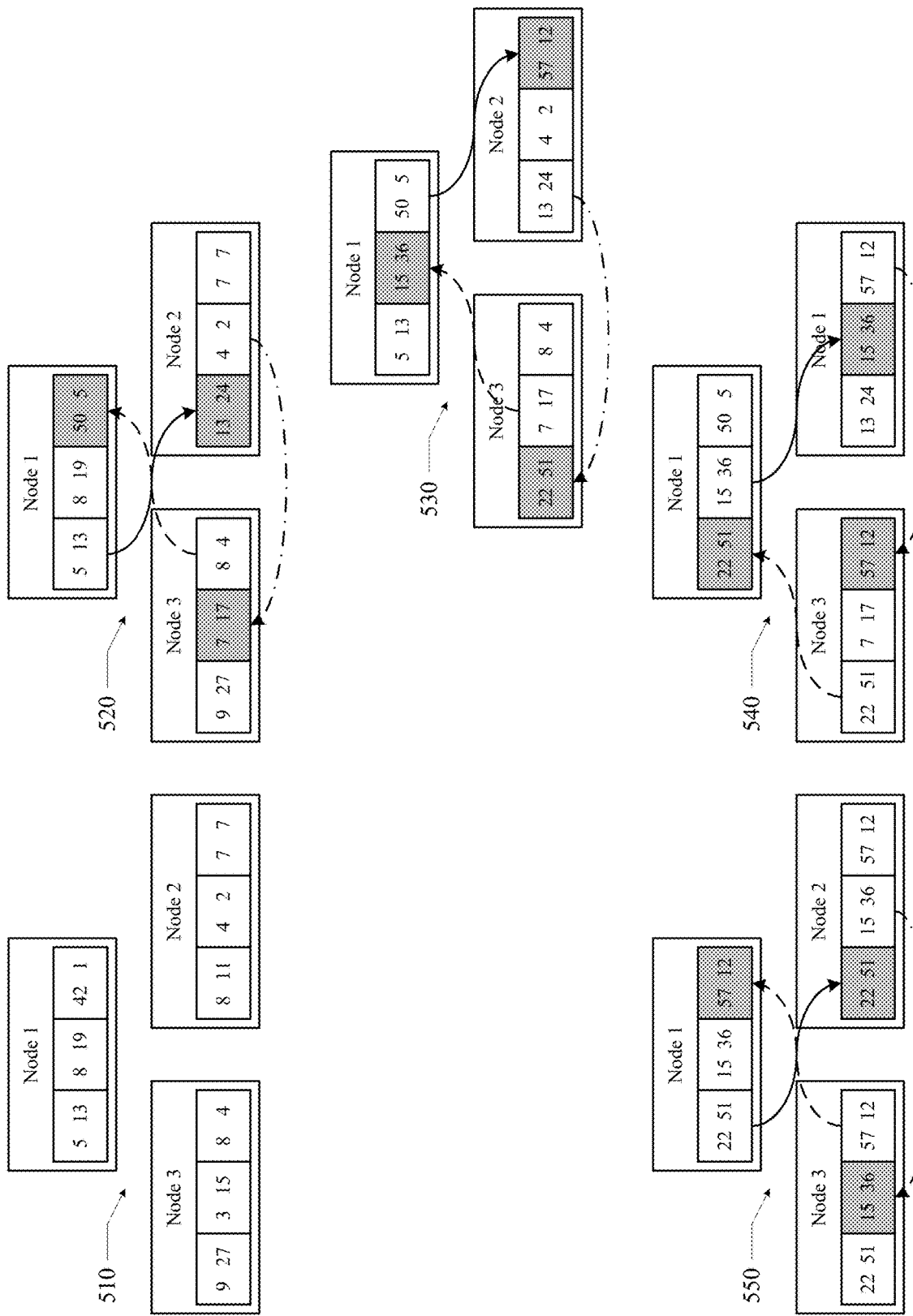
FIG. 5 illustrates a ring-based All_Reduce computation according to the conventional art.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 6:
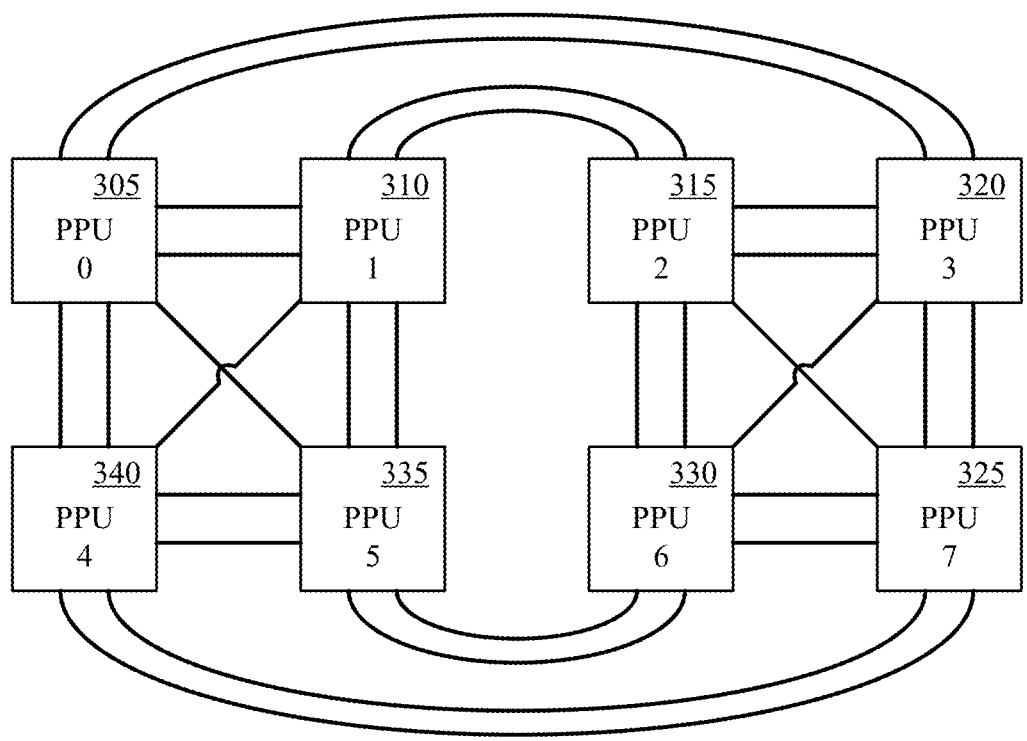
FIG. 6 shows an exemplary topology of a plurality of parallel processing units (PPUs), in accordance with aspects of the present technology.

Referring now to FIG. 6, an exemplary topology of a plurality of parallel processing units (PPUs), in accordance with aspects of the present technology, is shown. The plurality of PPUs can include one or more sets of eight PPUs Each PPU can include seven communication ports. The eight PPUs in a set can be organized in a first subset of four PPUs and a second subset of four PPUs. Each PPU can be configurably couplable to two nearest neighbor PPUs in a same subset by two communication links. Each PPU can also be configurably couplable to a farthest neighbor PPU in the same subset by one communication link. Each PPU can also be configurably couplable to a corresponding PPU in the other subset by two communication links. In one implementation, the PPUs can be coupled by configurable bi-directional communication links. The configurably couplable communications links can be configured as up to three communication rings coupling eight PPUs together.

An application, however, is not typically concerned with the data structure topology of the PPUs and the configuration of communication links therebetween. For example, an All_Reduce function can be encoded as illustrated in Table 1.

TABLE 1

```
//Kernel for RingAllReduce( ) on each dev:
Foo( ) {
    #parallel for (i=0; i<3; i++) {
        RecBuff[i] = RECV(prev[i].buff1);
        SendBuff[1] + LocalBuff[i];
        SEND(next[i].buff2, SendBuff[i]);
    }
}
```

Figure 7:
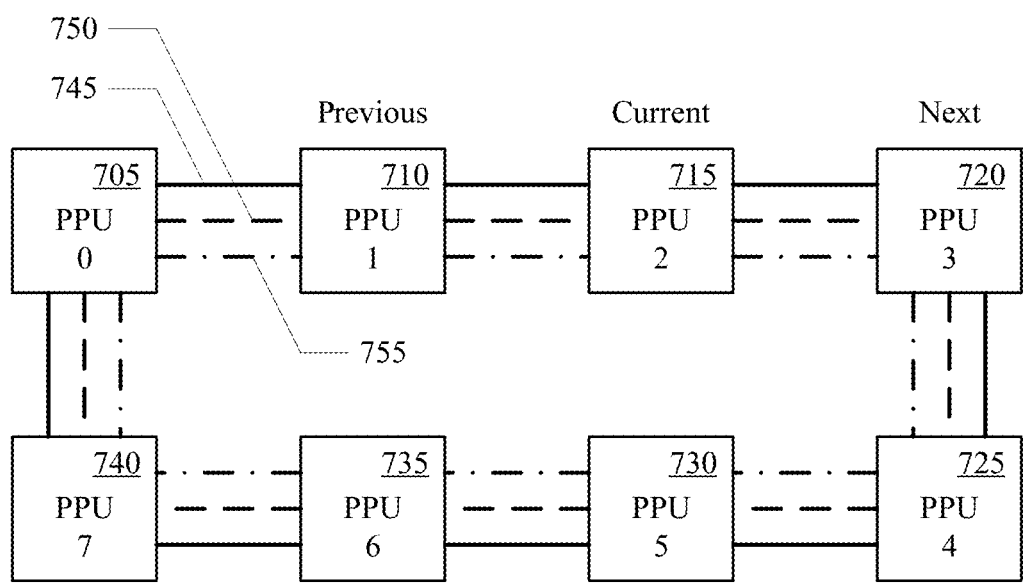
FIG. 7 shows an exemplary virtual PPU topology, in accordance with aspects of the present technology.

The topology as it appears to the application, in one example, can be a ring of eight PPUs coupled by three communication rings as illustrated in FIG. 7.

In another example, the All_Reduce function in an application can be encoded as illustrated in Table 2.

TABLE 2

```
//Kernel on dev-C:
//i=0 (TB0) is for Ring-0(dot-dash 810) {
    RecBuff[0] = LD(&(B::buff1+0))
    SendBuff[0] = RecBuff[0] + LocalBuff[0];
    SEND(&(D::buff2+0), SendBuff[0]);
}
//i=1 (TB1) is for Ring-1(long dash 820) {
    RecBuff[1] = LD(&(B::buff1+1))
    SendBuff[1] = RecBuff[1] + LocalBuff[1];
    SEND(&(D::buff2+1), SendBuff[1]);
}
//i=2 (TB2) is for Ring-2(short dash 830) {
    RecBuff[2] = LD(&(B::buff1+0))
    SendBuff[2] = RecBuff[2] + LocalBuff[2];
    SEND(&(D::buff2+0), SendBuff[2]);
}
```

Figure 8:
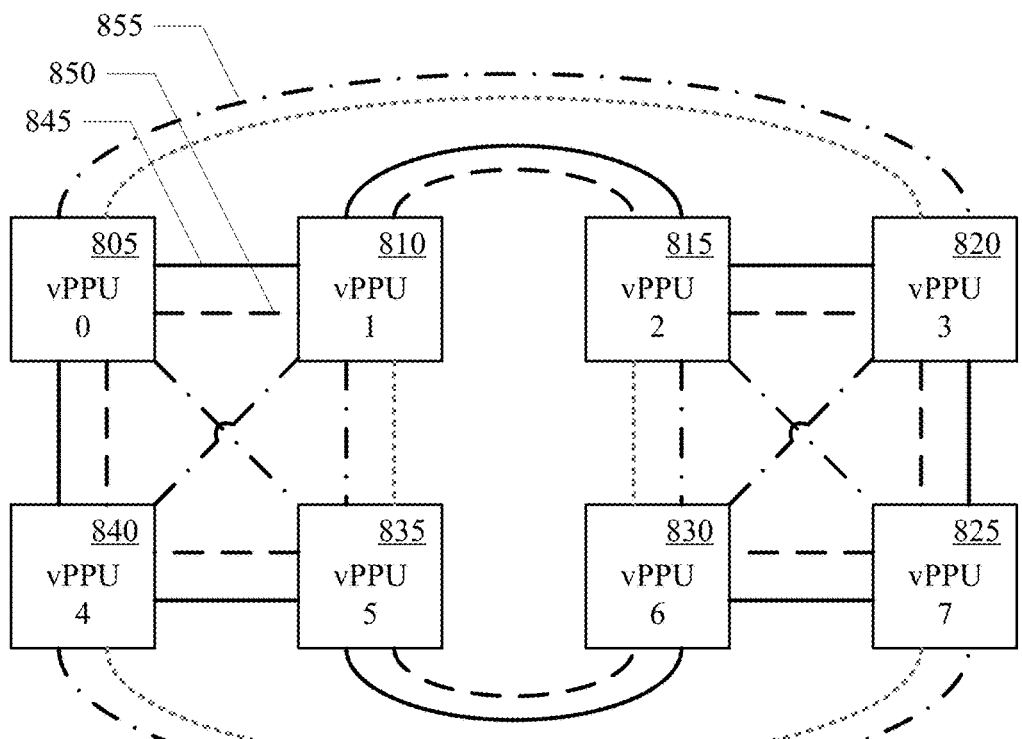
FIG. 8 shows another exemplary virtual PPU topology, in accordance with aspects of the present technology.
Figure 9:
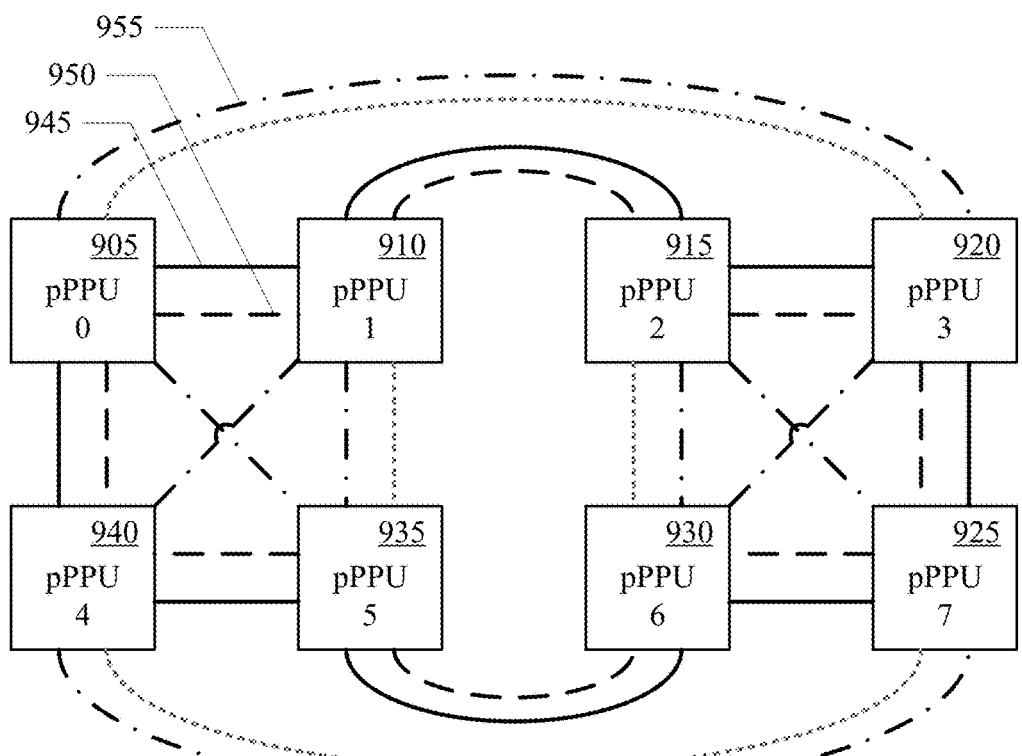
FIG. 9 shows another exemplary physical PPU topology, in accordance with aspects of the present technology.

Applications can be written to be processing unit agnostic. The virtual function (VF) driver can utilize a topology based on virtual parallel processing unit (vPPU) identifiers. The hardware (HW) and physical function (PF) driver can utilize a topology based on physical parallel processing unit (pPPU) identifiers. Referring now to FIG. 8, an exemplary topology with eight virtual PPUs 805-840 coupled by three communication rings 845-855 is shown. For a virtual function driver using virtual PPU identifiers, a current virtual PPU 815 can be coupled by a first communication ring 845 (solid line) to a previous virtual PPU 810 and a next virtual PPU 820. The current virtual PPU 815 can also be coupled by a second communication ring 850 (dashed line) to a previous virtual PPU 810 and a next virtual PPU 820. The current virtual PPU 815 can also be coupled by a third communication ring 855 (dash-dotted line) to a previous virtual PPU 825 and a next virtual PPU 830. The physical function and hardware can similarly use corresponding physical PPU identifiers, as illustrated in FIG. 9.

Figure 10:
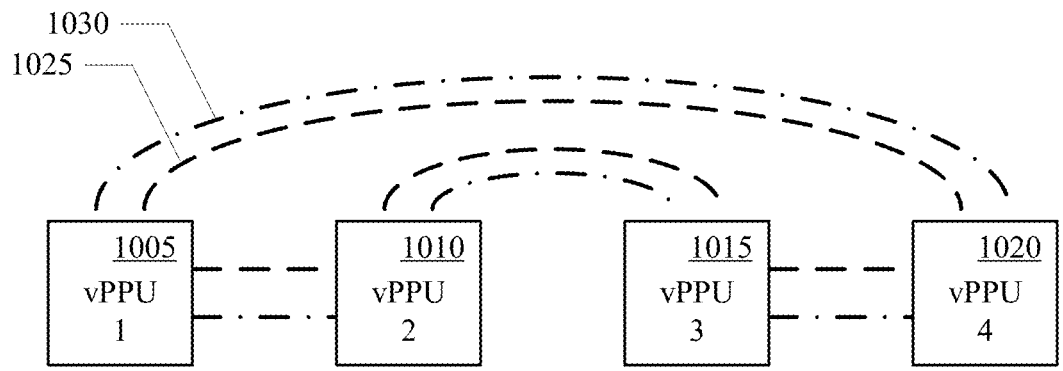
FIG. 10 illustrates PPU virtualization, in accordance with aspects of the present.
Figure 11:
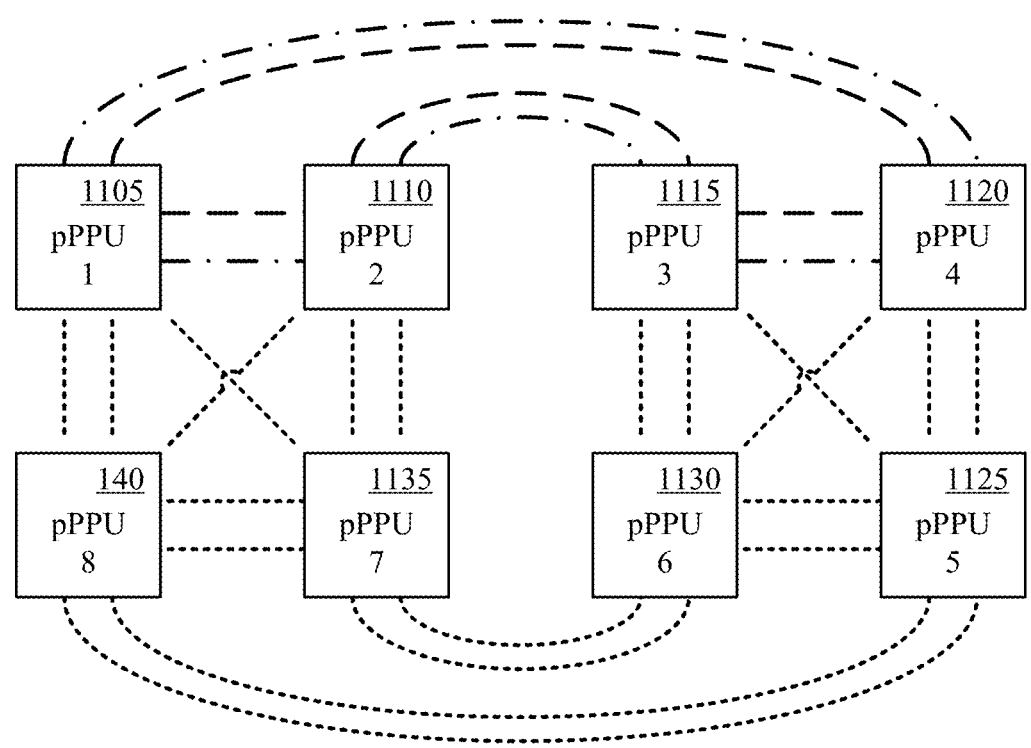
FIG. 11 illustrates PPU virtualization, in accordance with aspects of the present.

Referring now to FIG. 10, an exemplary virtual PPU topology is shown. The virtual PPU topology can include four virtual PPUs 1005-1020 coupled by two communication rings 1025, 1030. Referring now to FIG. 11, PPU virtualization, in accordance with aspects of the present technology, can be utilized to migrate an application to a same system with a same configuration, or migrate to a same system with a same topology. In one implementation, a virtual PPU identifier to physical PPU identifiers mapping can be utilized to migrate to a same system with the same configuration or with the same topology, as illustrated in Table 3.

TABLE 3

| vPPU | pPPU |
|---|---|
| vPPU 1 | pPPU 1 |
| vPPU 2 | pPPU 2 |
| vPPU 3 | pPPU 3 |
| vPPU 4 | pPPU 4 |

Figure 12:
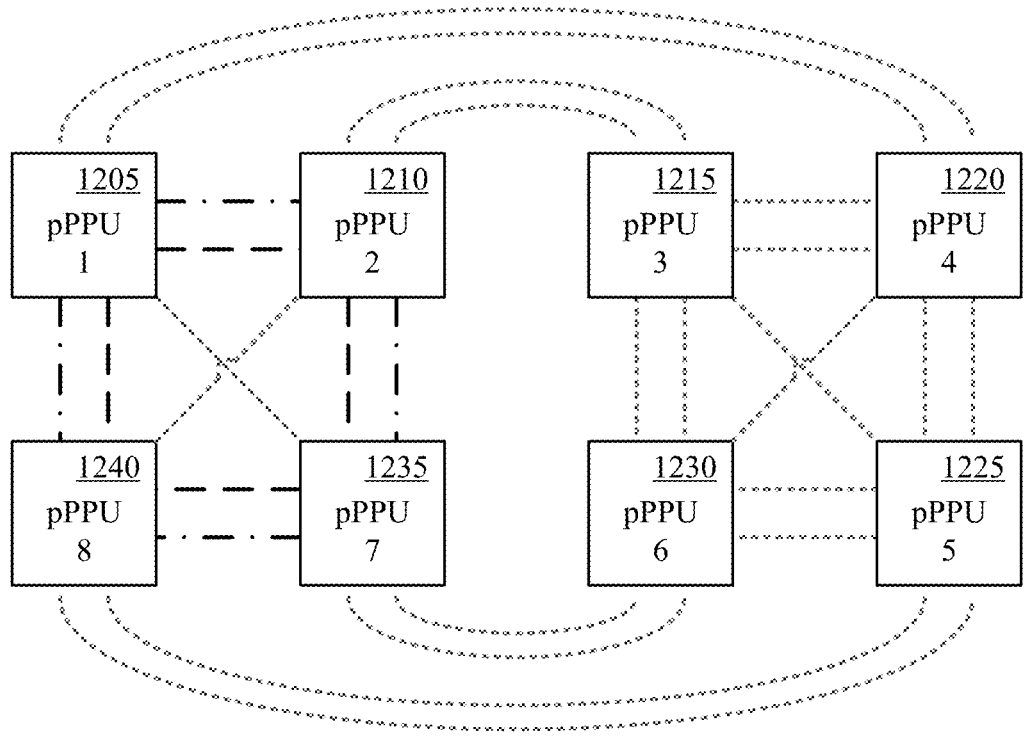
FIG. 12 illustrates PPU virtualization, in accordance with aspects of the present.

Referring now to FIG. 12, PPU virtualization, in accordance with aspects of the present technology, can also be utilized to migrate to a same system with a different topology. The virtual PPU identifier to physical PPU mapping can also be utilized to migrate to a same system with a deferent topology, as illustrated in Table 4.

TABLE 4

| vPPU | pPPU |
|---|---|
| vPPU 1 | pPPU 1 |
| vPPU 2 | pPPU 2 |
| vPPU 3 | pPPU 7 |
| vPPU 4 | pPPU 8 |

Figure 13:
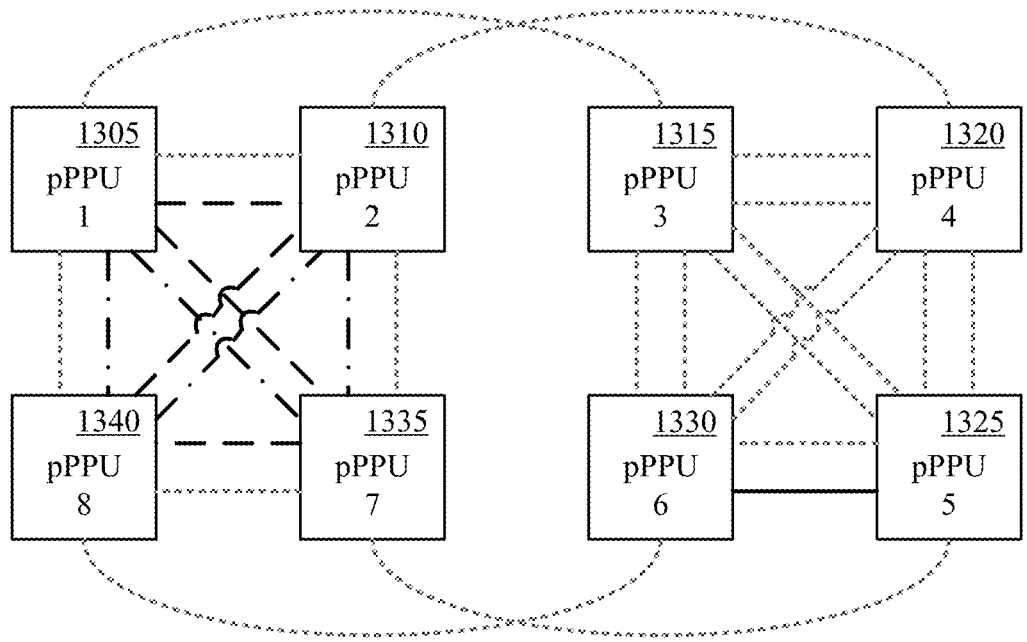
FIG. 13 illustrates PPU virtualization, in accordance with aspects of the present.

Referring now to FIG. 13, PPU virtualization, in accordance with aspects of the present technology, may in some cases also be utilized to migrate to a compatible system. The virtual PPU identifier to physical PPU identifiers mapping for each of the communication rings may also be utilized to migrate to a compatible system, as illustrated in Tables 5A and 5B.

TABLE 5A

| First Comm. Link (dashed) | |
|---|---|
| vPPU | pPPU |
| vPPU 1 | pPPU 1 |
| vPPU 2 | pPPU 2 |
| vPPU 3 | pPPU 8 |
| vPPU 4 | pPPU 7 |

TABLE 5B

| Second Comm. Ring (dash-dotted) | |
|---|---|
| vPPU | pPPU |
| vPPU 1 | pPPU 1 |
| vPPU 2 | pPPU 7 |
| vPPU 3 | pPPU 2 |
| vPPU 4 | pPPU 8 |

Figure 14B:
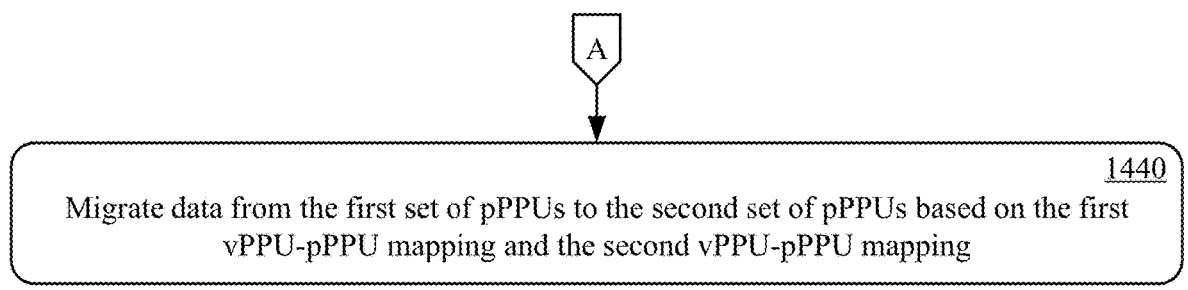
Figure 15:
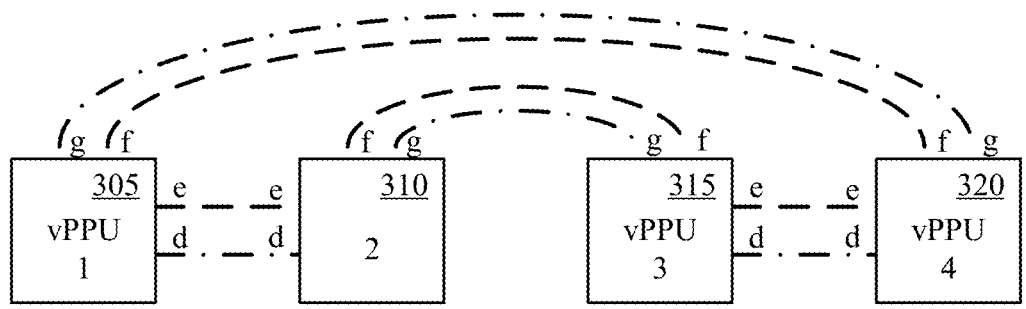
FIG. 15 illustrates a virtual PPU, in accordance with aspects of the present.
Figure 16:
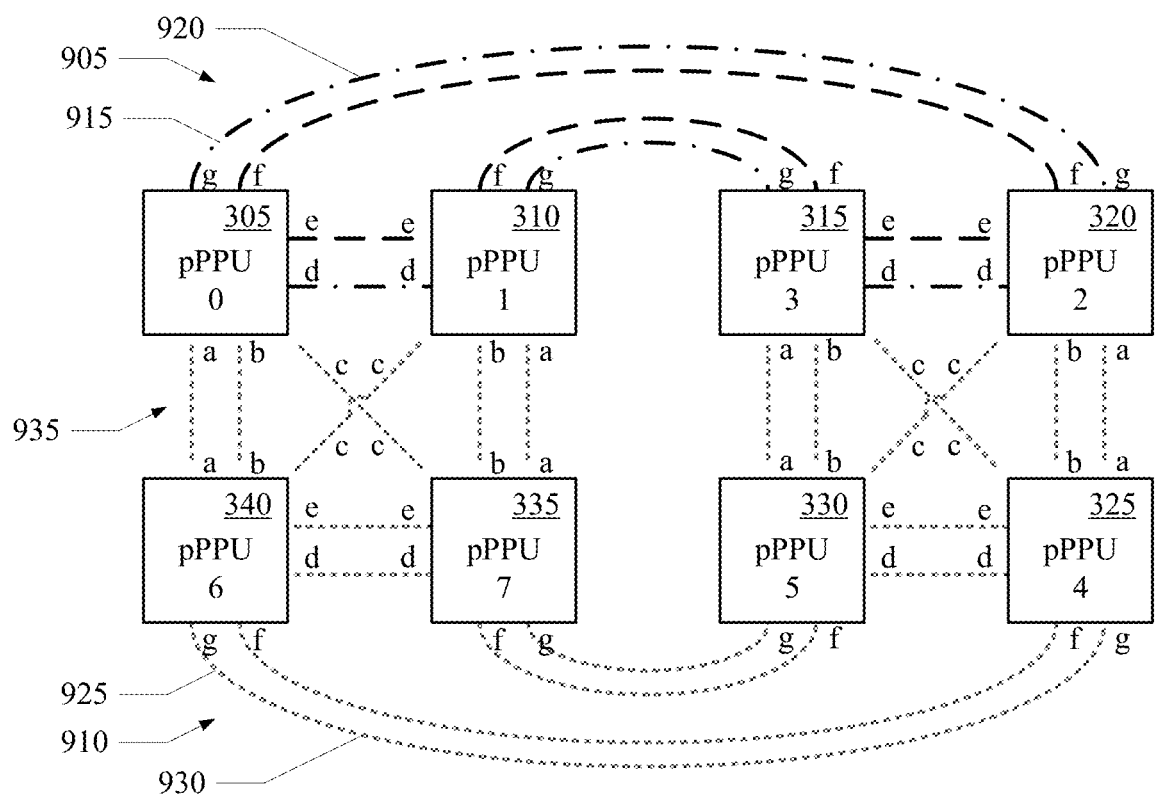
FIG. 16 illustrates a first PPU, in accordance with aspects of the present.
Figure 17:
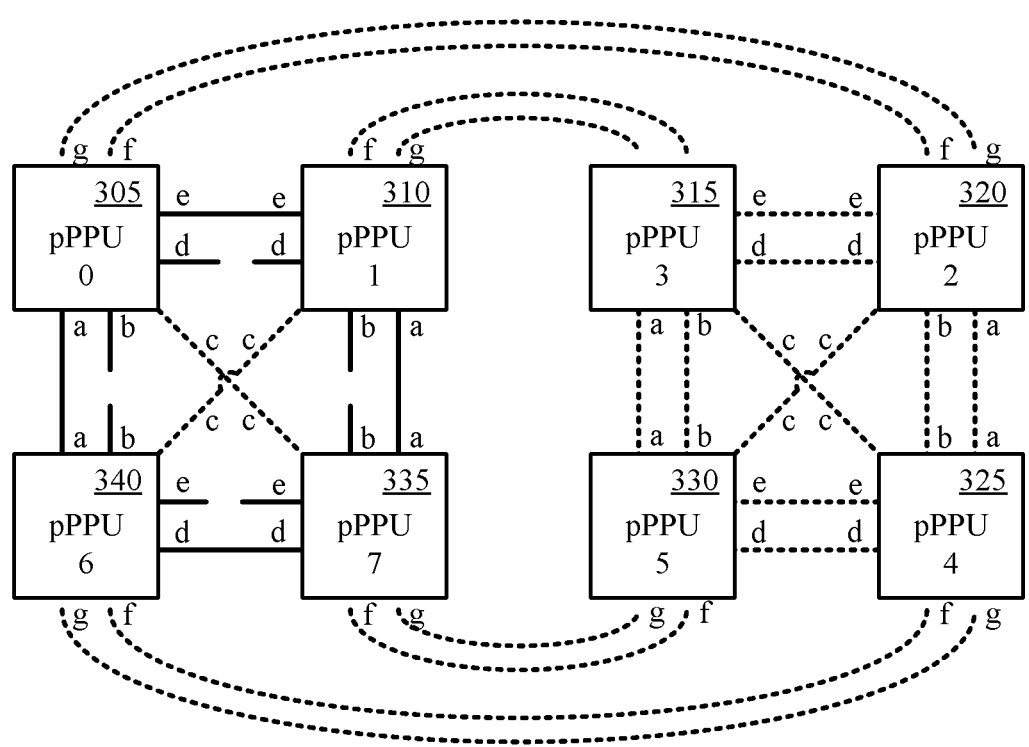
FIG. 17 illustrates a second PPU, in accordance with aspects of the present.

Referring now to FIGS. 14A and 14B, a method of PPU virtualization and migration, in accordance with aspects of the present technology, is shown. The method of PPU virtualization and migration will be further explained with reference to FIGS. 15-17. FIG. 15 illustrates a configuration of a set of virtual PPUs. FIG. 16 illustrates a first configuration of a set of physical PPUs. FIG. 17 illustrates a second configuration of a set of physical PPUs. The method can include a deployment phase and a migration phase. In the deployment phase, the virtual PPUs utilized by the virtual function (VF) driver can be determined, at 1405. For example, it can be determined that four virtual PPUs are utilized by the VF driver. At 1410, virtual function routing tables for the virtual PPUs can be determined from the logical topology of the virtual function (VF). For example, routing tables mapping the communication links between the virtual PPUs utilized by vPPU 1 through vPPU 4 can be generated as illustrated in Tables 6A, 6B, 6C and 6D respectively.

TABLE 6A

| vPPU 1 routing table | a | b | c | d | e | f | g |
|---|---|---|---|---|---|---|---|
| vPPU 1 | | | | | | | |
| vPPU 2 | | | | 1 | 1 | | |
| vPPU 3 | | | | | | | |
| vPPU 4 | | | | | | 1 | 1 |

Table 6A indicates that vPPU 1 is coupled to vPPU 2 by communication links d and e, and that vPPP 1 is coupled to vPPU 3 by communication links f and g.

TABLE 6B

| vPPU 2 routing table | a | b | c | d | e | f | g |
|---|---|---|---|---|---|---|---|
| vPPU 1 | | | | 1 | 1 | | |
| vPPU 2 | | | | | | | |
| vPPU 3 | | | | | | 1 | 1 |
| vPPU 4 | | | | | | | |

Table 6B indicates that vPPU 2 is coupled to vPPU 1 by communication links d and e, and is coupled to vPPU 3 by communication links f and g.

TABLE 6C

| vPPU 3 routing table | a | b | c | d | e | f | g |
|---|---|---|---|---|---|---|---|
| vPPU 1 | | | | | | | |
| vPPU 2 | | | | | | 1 | 1 |
| vPPU 3 | | | | | | | |
| vPPU 4 | | | | 1 | 1 | | |

Table 6C indicates that vPPU 3 is coupled to vPPU 2 by communication links f and g, and is coupled to vPPU 3 by communication links d and e.

TABLE 6D

| vPPU 4 routing table | a | b | c | d | e | f | g |
|---|---|---|---|---|---|---|---|
| vPPU 1 | | | | | | 1 | 1 |
| vPPU 2 | | | | | | | |
| vPPU 3 | | | | 1 | 1 | | |
| vPPU 4 | | | | | | | |

Table 6D indicates that vPPU 4 is coupled to vPPU 3 by communication links d and e, and is coupled to vPPU 1 by communication links f and g.

At 1415, the virtual PPUs can be mapped to a first set of a plurality of physical PPUs. For example, the plurality of physical PPUs can include pPPU 0 through pPPU 7. The vPPU 1 through vPPU 4 can be mapped to pPPU 0 through pPPU 3 as illustrated in Table 7.

TABLE 7

| vPPU 1 | pPPU 0 |
|---|---|
| vPPU 2 | pPPU 1 |
| vPPU 3 | pPPU 3 |
| vPPU 4 | pPPU 2 |

At 1420, a first set of physical function routing tables for the first set of the physical PPUs can be generated based on the virtual function routing tables and the first vPPU-pPPU mapping. For example, routing tables mapping the communication links between the physical PPUs utilized by the pPPU 0 through pPPU 3 can be generated as illustrated in Tables 8A, 8B, 8C and 8D respectively.

TABLE 8A

| pPPU 0 routing table | a | b | c | d | e | f | g |
|---|---|---|---|---|---|---|---|
| pPPU 0 | | | | | | | |
| pPPU 1 | | | | 1 | 1 | | |
| pPPU 2 | | | | | | 1 | 1 |
| pPPU 3 | | | | | | | |

Table 8A indicates that pPPU 0 is coupled to pPPU 1 by communication links d and e, and that pPPU 0 is coupled to pPPU 2 by communication links f and g.

TABLE 8B

| pPPU 1 routing table | a | b | c | d | e | f | g |
|---|---|---|---|---|---|---|---|
| pPPU 0 | | | | 1 | 1 | | |
| pPPU 1 | | | | | | | |
| pPPU 2 | | | | | | | |
| pPPU 3 | | | | | | 1 | 1 |

Table 8B indicates that pPPU 1 is coupled to pPPU 3 by communication links f and g, and to pPPU 0 by communication links d and e.

TABLE 8C

| pPPU 2 routing table | a | b | c | d | e | f | g |
|---|---|---|---|---|---|---|---|
| pPPU 0 | | | | | | 1 | 1 |
| pPPU 1 | | | | | | | |
| pPPU 2 | | | | | | | |
| pPPU 3 | | | | 1 | 1 | | |

Table 8C indicates that pPPU 2 is coupled to pPPU 0 by communication links f and g, and to pPPU 3 by communication links d and e.

TABLE 8D

| pPPU 3 routing table | a | b | c | d | e | f | g |
|---|---|---|---|---|---|---|---|
| pPPU 0 | | | | | | | |
| pPPU 1 | | | | | | 1 | 1 |
| pPPU 2 | | | | 1 | 1 | | |
| pPPU 3 | | | | | | | |

Table 8D indicates that pPPU 3 is coupled to pPPU 2 by communication links d and e, and to pPPU 1 by communication links f and g. Thereafter the application can be executed using the first vPPU-pPPU mapping.

At 1425, a migration events can be received. In response to the migration event, the virtual PPUs can be mapped to a second set of a plurality of physical PPUs, at 1430. The second set of physical PPUs can be within the same plurality of physical PPUs or in a new plurality of physical PPUs. For example, vPPU 1 through vPPU 4 can be mapped to pPPU 0, pPPU 1, pPPU 7 and pPPU 6 of a new plurality of parallel processing units as illustrated in Table 9.

TABLE 9

| vPPU 1 | pPPU 0 |
|---|---|
| vPPU 2 | pPPU 1 |
| vPPU 3 | pPPU 7 |
| vPPU 4 | pPPU 6 |

At 1435, a second set of physical function routing tables for the second set of physical PPUs can be generated based on the virtual function routing tables and the second vPPU-pPPU mapping. For example, routing tables mapping the communication links between the physical PPUs can be generated as illustrated in Tables 10A, 10B, 10C and 10D respectively.

TABLE 10A

| pPPU 0 routing table | a | b | c | d | e | f | g |
|---|---|---|---|---|---|---|---|
| pPPU 0 | | | | | | | |
| pPPU 1 | | | | 1 | 1 | | |
| pPPU 7 | | | | | | | |
| pPPU 6 | | | | | | 1 | 1 |

Table 10A indicates that pPPU 0 is coupled to pPPU 1 by communication links d and e, and that pPPU 0 is coupled to pPPU 2 by communication links f and g.

TABLE 10B

| pPPU 1 routing table | a | b | c | d | e | f | g |
|---|---|---|---|---|---|---|---|
| pPPU 0 | | | | 1 | 1 | | |
| pPPU 1 | | | | | | | |
| pPPU 7 | 1 | 1 | | | | | |
| pPPU 6 | | | | | | | |

Table 10B indicates that pPPU 1 is coupled to pPPU 7 by communication links 1 and b, and to pPPU 0 by communication links d and e.

TABLE 10C

| pPPU 7 routing table | a | b | c | d | e | f | g |
|---|---|---|---|---|---|---|---|
| pPPU 0 | | | | | | | |
| pPPU 1 | 1 | 1 | | | | | |
| pPPU 7 | | | | | | | |
| pPPU 6 | | | | 1 | 1 | | |

Table 10C indicates that pPPU 7 is coupled to pPPU 1 by communication links a and b, and to pPPU 6 by communication links d and e.

TABLE 10D

| pPPU 6 routing table | a | b | c | d | e | f | g |
|---|---|---|---|---|---|---|---|
| pPPU 0 | | | | | | | |
| pPPU 1 | 1 | 1 | | | | | |
| pPPU 7 | | | | 1 | 1 | | |
| pPPU 6 | | | | | | | |

Table 10D indicates that pPPU 6 is coupled to pPPU 1 by communication links a and b, and to pPPU 7 by communication links d and e.

At 1440, data from the first set of physical PPUs can be migrated to the second set of physical PPUs based on the first vPPU-pPPU mapping and the second vPPU-pPPU mapping. Thereafter the application can be executed by the virtual function driver using the second vPPU-pPPU mapping.

Figure 18B:
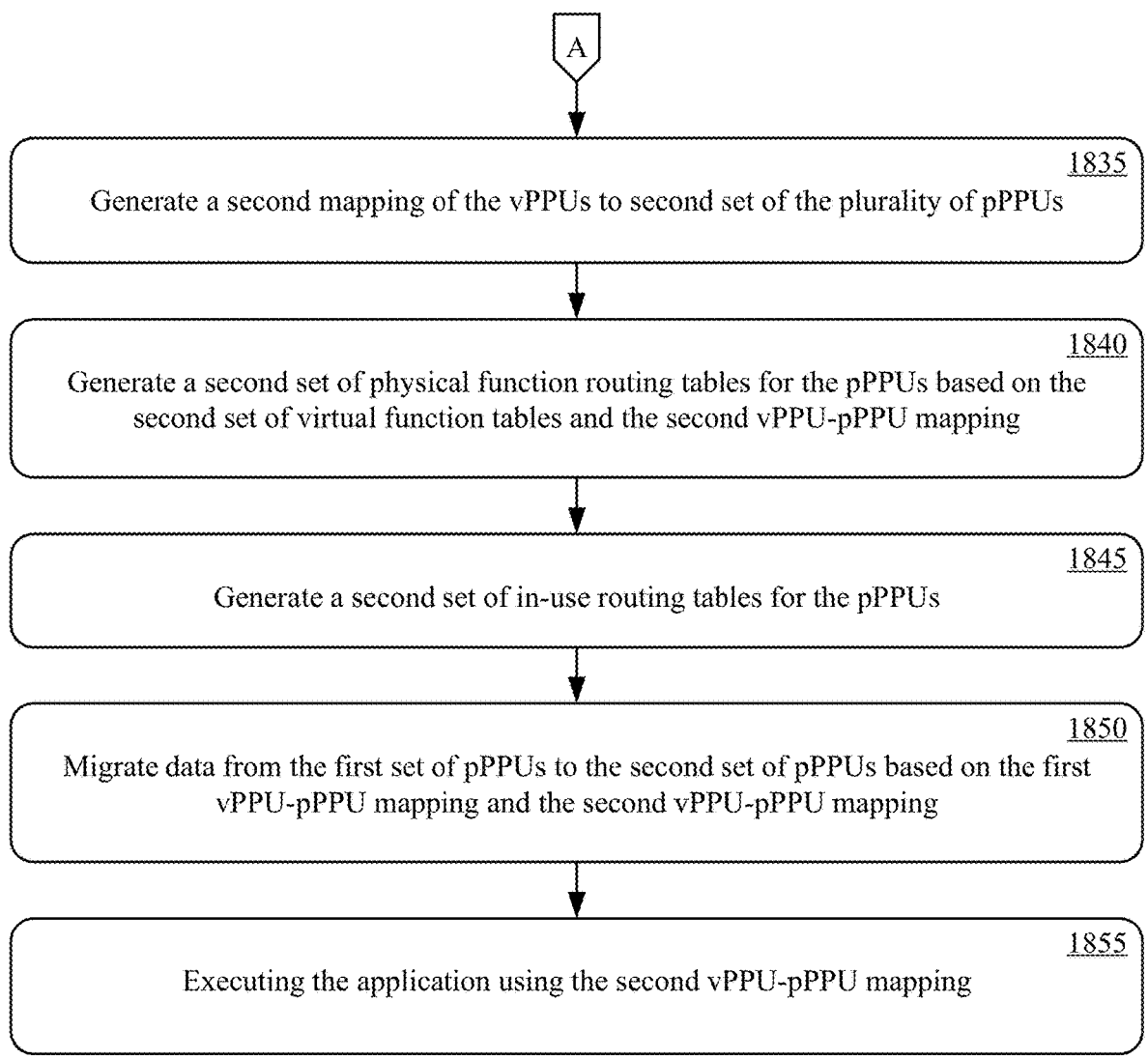

Referring now to FIGS. 18A and 18B, another method of PPU virtualization for migration, in accordance with aspects of the present technology, is shown. The method of PPU virtualization for migration will be further explained with reference again to FIGS. 15-17. In the deployment phase, the virtual PPUs utilized by the virtual function (VF) driver can be determined, at 1805. For example, it can be determined from the virtual function that four virtual PPUs are utilized by the VF. At 1810, virtual function routing tables for the virtual PPUs can be determined from the logical topology of the virtual function (VF). For example, routing tables mapping the communication links between the virtual PPUs utilized by the vPPU 1 through vPPU 4 can be generated as illustrated in Tables 6A, 6B, 6C and 6D respectively.

At 1815, the virtual PPUs can be mapped to a first set of a plurality of physical PPUs. For example, the plurality of physical PPUs can include pPPU 0 through pPPU 7. The vPPU 1 through vPPU 4 can be mapped to pPPP 0 through pPPP 3 as illustrated in Table 7.

At 1820, a first set of physical function routing tables for first set of the physical PPUs can be generated based on the virtual function routing tables and the first vPPU-pPPU mapping. For example, physical function routing tables mapping the communication links between the physical PPUs utilized by the pPPU 0 through pPPU 3 can be generated as illustrated in Tables 8A, 8B, 8C and 8D respectively. In one implementation, the physical function routing table can be stored in hardware register. At 1825, a first set of in-use routing table for the physical PPUs can be generated. For example, in-use routing tables mapping the in-use communication links between the physical PPUs utilized by pPPU 0 through pPPU3 can be generated as illustrated in Tables 11A, 11B, 11C and 11D respectively.

TABLE 11A

| pPPU 0 routing table | P-a | P-b | P-c | P-d | P-e | P-f | P-g |
|---|---|---|---|---|---|---|---|
| pPPU 0 | | | | | | | |
| pPPU 1 | | | | | 1 | | |
| pPPU 2 | | | | | | 1 | |
| pPPU 3 | | | | | | | |

Table 11A indicates that pPPU 0 is coupled to pPPU 1 by communication link e, and to pPPU 2 by communication link f.

TABLE 11B

| pPPU 1 routing table | P-a | P-b | P-c | P-d | P-e | P-f | P-g |
|---|---|---|---|---|---|---|---|
| pPPU 0 | | | | | 1 | | |
| pPPU 1 | | | | | | | |
| pPPU 2 | | | | | | | |
| pPPU 3 | | | | | | 1 | |

Table 11B indicates that pPPU 1 is coupled to pPPU 3 by communication link f, and to pPPU 0 by communication link e.

TABLE 11C

| pPPU 2 routing table | P-a | P-b | P-c | P-d | P-e | P-f | P-g |
|---|---|---|---|---|---|---|---|
| pPPU 0 | | | | | | 1 | |
| pPPU 1 | | | | | | | |
| pPPU 2 | | | | | | | |
| pPPU 3 | | | | | 1 | | |

Table 11C indicates that pPPU 2 is coupled to pPPU 0 by communication link f, and to pPPU 3 by communication link e.

TABLE 11D

| pPPU 3 routing table | P-a | P-b | P-c | P-d | P-e | P-f | P-g |
|---|---|---|---|---|---|---|---|
| pPPU 0 | | | | | | | |
| pPPU 1 | | | | | | 1 | |
| pPPU 2 | | | | | 1 | | |
| pPPU 3 | | | | | | | |

Table 11D indicates that pPPU 3 is coupled to pPPU 2 by communication link e, and to pPPU 1 by communication link f. In one implementation, the first set of in-use routing tables can be stored in the physical hub (PHUB) and the switch in hardware for the plurality of PPUs. At 1825, an application can be executed using the first vPPU-pPPU mapping. In one implementation, the in-hardware routing tables are physical PPU identifier based, and virtual PPU identifier base routing tables are exposed to the virtual function driver. The first vPPU-pPPU mapping can be looked up for runtime execution. In one implementation, the memory space (e.g., page tables) is vPPU identifier base. Accordingly, the application is transparent, but the data structure is mapped to vPPU identifiers.

At 1830, a migration events can be received. In response to the migration event, the virtual PPUs can be mapped to a second set of a plurality of physical PPU, at 1835. The second set of physical PPUs can be within the same plurality of physical PPUs or in a new plurality of physical PPUs. In one example, vPPU 1 through vPPU 4 can be mapped to pPPU 0, pPPU 1, pPPU 7 and pPPU 6 of a new plurality of parallel processing units as illustrated in Table 9.

At 1840, a second set of physical function routing tables for the physical PPUs can be generated based on the virtual function routing tables and the first vPPU-pPPU mapping. For example, physical function routing tables mapping the communication links between the physical PPUs utilized by pPPU 0, pPPU 1, pPPU 6 and pPPU 7 can be generated as illustrated in Tables 8A, 8B, 8C and 8D respectively. In one implementation, the physical function routing tables can be stored in hardware registers. At 1845, a second set of in-use routing tables for the physical PPUs can be generated. For example, in-use routing tables mapping the in-use communication links between the physical PPUs utilized by pPPU 0, pPPU 1, pPPU 6 and pPPU 7 can be generated as illustrated in Tables 12A, 12B, 12C and 12D respectively.

TABLE 12A

| pPPU 0 routing table | P-a | P-b | P-c | P-d | P-e | P-f | P-g |
|---|---|---|---|---|---|---|---|
| pPPU 0 | | | | | | | |
| pPPU 1 | | | | | 1 | | |
| pPPU 6 | 1 | | | | | | |
| pPPU 7 | | | | | | | |

Table 12A indicates that pPPU 0 is coupled to pPPU 1 by communication link e, and to pPPU 6 by communication link a.

TABLE 12B

| pPPU 1 routing table | P-a | P-b | P-c | P-d | P-e | P-f | P-g |
|---|---|---|---|---|---|---|---|
| pPPU 0 | | | | | 1 | | |
| pPPU 1 | | | | | | | |
| pPPU 6 | | | | | | | |
| pPPU 7 | 1 | | | | | | |

Table 12B indicates that pPPU 1 is coupled to pPPU 7 by communication links a, and to pPPU 0 by communication link e.

TABLE 12C

| pPPU 7 routing table | P-a | P-b | P-c | P-d | P-e | P-f | P-g |
|---|---|---|---|---|---|---|---|
| pPPU 0 | | | | | | | |
| pPPU 1 | 1 | | | | | | |
| pPPU 6 | | | | | 1 | | |
| pPPU 7 | | | | | | | |

Table 12C indicates that pPPU 7 is coupled to pPPU 1 by communication link l, and to pPPU 6 by communication link e.

TABLE 12D

| pPPU 6 routing table | P-a | P-b | P-c | P-d | P-e | P-f | P-g |
|---|---|---|---|---|---|---|---|
| pPPU 0 | 1 | | | | | | |
| pPPU 1 | | | | | | | |
| pPPU 6 | | | | | | | |
| pPPU 7 | | | | | 1 | | |

Table 12D indicates that pPPU 6 is coupled to pPPU 7 by communication link e, and to pPPU 0 by communication link a. In one implementation, the second set of in-use routing tables can be stored in the physical hub (PHUB) and switch of the hardware for the plurality of PPUs. At 1850, data from the first set of physical PPUs can be migrated to the second set of physical PPUs based on the first vPPU-pPPU mapping and the second vPPU-pPPU mapping. Thereafter the application can be executed by the virtual function driver using the second vPPU-pPPU mapping, at 1855. In one implementation, the in-hardware routing tables are physical PPU identifier based, and virtual PPU identifier base routing tables are exposed to the virtual function driver. The second vPPU-pPPU mapping can be looked up for runtime execution. In one implementation, the memory space (e.g., page tables) is virtual PPU identifier base. Accordingly, the application is transparent, but the data structure is mapped to the virtual PPU identifier.

Figure 19A:
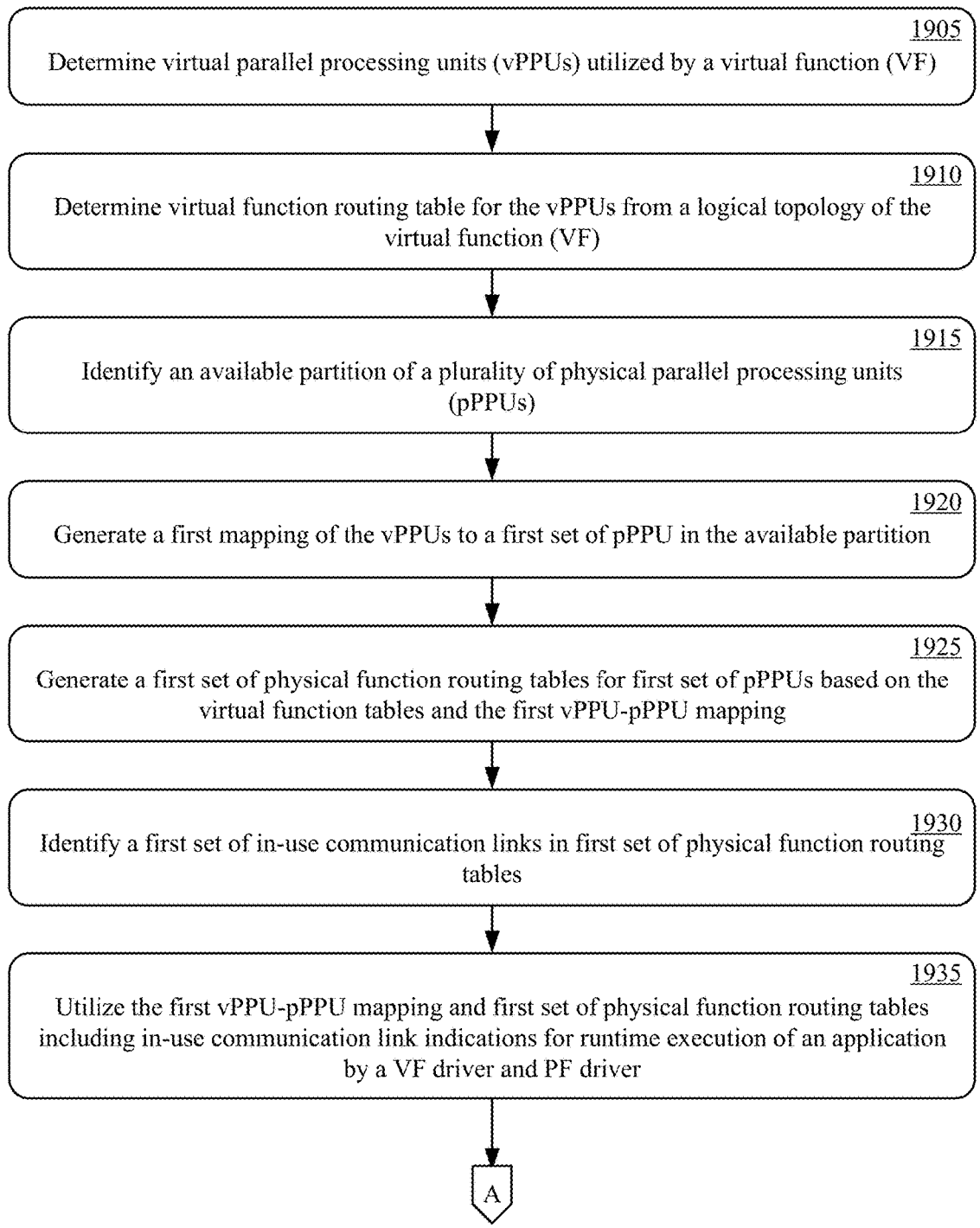
FIGS. 19A and 19B shows a method of parallel processing unit (PPU) virtualization for migration, in accordance with aspects of the present technology.
Figure 19B:
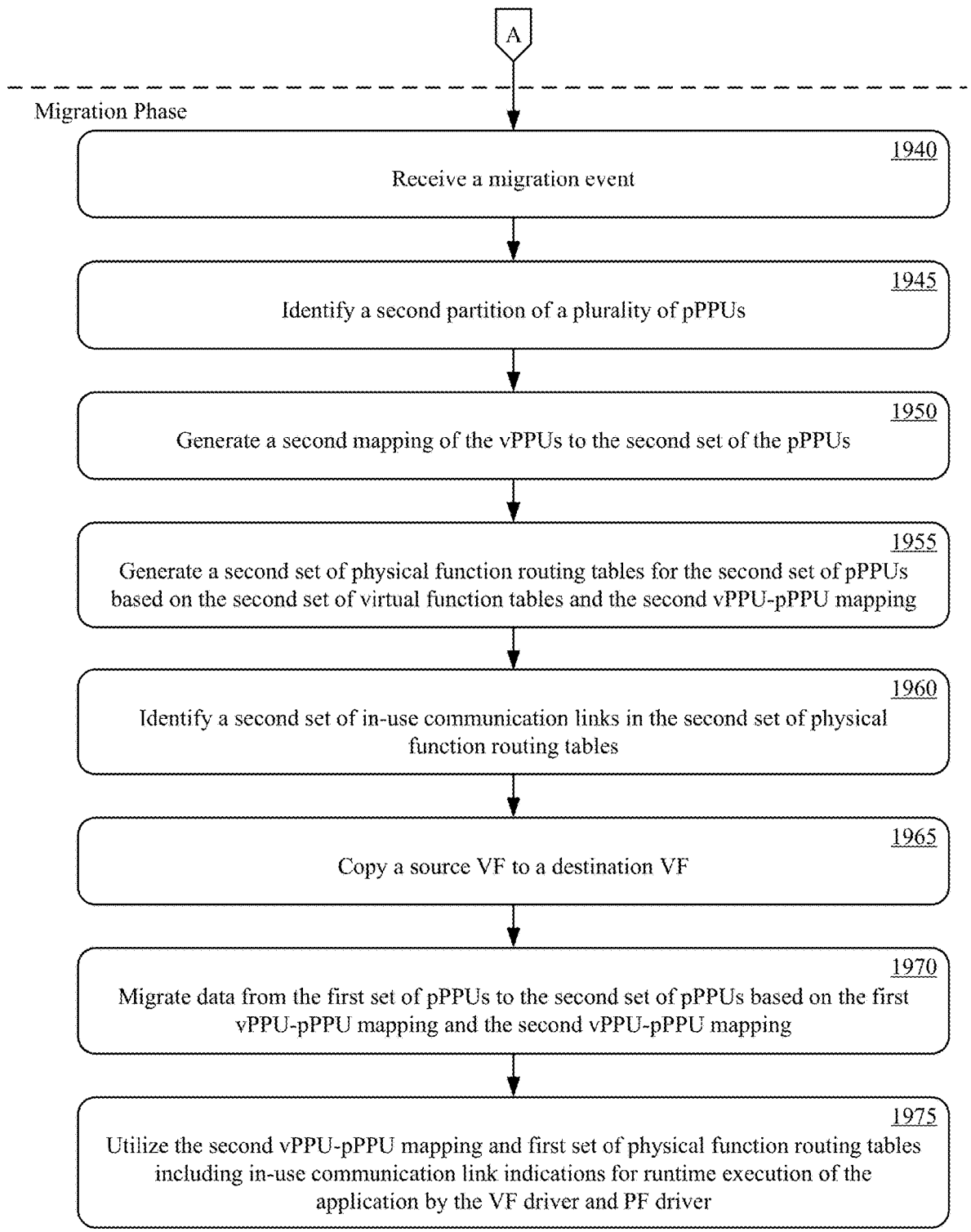

Referring now to FIGS. 19A and 19B, yet another method of PPU virtualization for migration, in accordance with aspects of the present technology, is shown. The method of PPU virtualization for migration will again be further explained with reference again to FIGS. 15-17. In the deployment phase, the virtual PPUs utilized by the virtual function (VF) driver can be determined, at 1905. For example, it can be determined that four virtual PPUs are utilized by the VF driver. In one implementation, a logical topology graph of virtual PPUs utilized by the VF can be stored in system memory. At 1910, virtual function routing tables can be determined from the logical topology of the virtual function (VF). For example, routing tables mapping the communication links between the virtual PPUs utilized by vPPU 1 through vPPU 4 can be generated as illustrated in Tables 6A, 6B, 6C and 6D respectively. In one implementation, the virtual function routing tables can be stored in system memory.

At 1915, a first partition of a plurality of physical PPUs can be identified. For example, an available partition of a full topology of physical PPUs can be identified. In one implementation, the physical function can query the hardware to build a system topology from the plurality of physical PPUs, which can be stored in system memory. Sub-system partition information for each VF can also be stored. For bare-metal PF implementation subsystems, partition information including in-use communication link information can be stored. At 1920, the virtual PPUs can be mapped to a first set of physical PPUs in the first partition of the plurality of physical PPUs. For example, the plurality of physical PPUs can include pPPU 0 through pPPU 7. The vPPU 1 through vPPU 4 can be mapped to pPPU 0 through pPPU 3 as illustrated in Table 7. The vPPU-pPPU mapping can be exposed to the virtual function.

At 1925, a first set of physical function n routing tables for the physical PPUs can be generated based on the virtual function routing tables and the first vPPU-pPPU mapping. In the routing tables, the physical PPU partition can be limited to a single VF. For example, physical function routing tables mapping the communication links between the physical PPUs utilized by the pPPU 0 through pPPU 3 can be generated. At 1930, in-use communication links for the first set of physical PPUs can be indicated in the first set of physical function routing tables. For example, routing tables mapping the communication links between the physical PPUs and indicating which communication links are in-use by pPPU 0 through pPPU 3 can be generated as illustrated in Tables 13A, 13B, 13C and 13D respectively.

TABLE 13A

| pPPU 0 routing table | P-a | P-b | P-c | P-d | P-e | P-f | P-g |
|---|---|---|---|---|---|---|---|
| pPPU 0 | | | | | | | |
| pPPU 1 | | | | 10 | 11 | | |
| pPPU 2 | | | | | | 11 | 10 |
| pPPU 3 | | | | | | | |

As illustrated in Table 13A, a first bit position can indicate that pPPU 0 is coupled to pPPU 1 by communication links d and e, and to pPPU 2 by communication links f and g. A second bit position can indicate communication link e is in use for coupling pPPU 0 to pPPU 1, and communication link f is in use for coupled pPPU 0 to pPPU2.

TABLE 13B

| pPPU 1 routing table | P-a | P-b | P-c | P-d | P-e | P-f | P-g |
|---|---|---|---|---|---|---|---|
| pPPU 0 | | | | 10 | 11 | | |
| pPPU 1 | | | | | | | |
| pPPU 2 | | | | | | | |
| pPPU 3 | | | | | | 11 | 10 |

Table 13B indicates that indicates that pPPU 1 is coupled to pPPU 3 by communication links f and g, and to pPPU 0 by communication links d and e. Table 13B also indicates that pPPU 1 is coupled to pPPU 3 by in-use communication link f, and to pPPU 0 by in-use communication link e.

TABLE 13C

| pPPU 2 routing table | P-a | P-b | P-c | P-d | P-e | P-f | P-g |
|---|---|---|---|---|---|---|---|
| pPPU 0 | | | | | | 11 | 10 |
| pPPU 1 | | | | | | | |
| pPPU 2 | | | | | | | |
| pPPU 3 | | | | 10 | 11 | | |

Table 13C indicates that pPPU 2 is coupled to pPPU 0 by communication links f and g, and to pPPU 3 by communication links d and e. Table 13C also indicates that pPPU 2 is coupled to pPPU 0 by in-use communication link f, and to pPPU 3 by in-use communication link e.

TABLE 13D

| pPPU 3 routing table | P-a | P-b | P-c | P-d | P-e | P-f | P-g |
|---|---|---|---|---|---|---|---|
| pPPU 0 | | | | | | | |
| pPPU 1 | | | | | | 11 | 10 |
| pPPU 2 | | | | 10 | 11 | | |
| pPPU 3 | | | | | | | |

Table 13D indicates that pPPU 3 is coupled to pPPU 2 by communication links d and e, and to pPPU 1 by communication links f and g. Table 13D also indicates that pPPU 3 is coupled to pPPU 2 by in-use communication link e, and to pPPU 1 by in-use communication link f. In one implementation, the physical function routing tables including in-use communication link information can be stored in hardware registers or the physical hub (PHUB)/switch of the hardware for the plurality of PPUs. During runtime, the VF/PF drivers can utilize the first vPPU-pPPU mapping and first set of physical function routing tables including the in-use communication link indications for execution on the PPU partition, at 1935.

At 1940, a migration events can be received. In response to the migration event, a second partition of a plurality of physical PPUs can be identified, at 1945. For example, an available new set of physical PPUs can be identified as a destination partition. In one implementation, the physical function can query the hardware to build a system topology for the plurality of physical PPUs, which can be stored in system memory. At 1950, the virtual PPUs can be mapped to a second set of physical PPUs. The seconds set of physical PPUs can be within the same plurality of physical PPUs or in a new plurality of physical PPUs. In one example, vPPU 1 through vPPU 4 can be mapped to pPPU 0, pPPU 1, pPPU 7 and pPPU 6 of a new plurality of parallel processing units as illustrated in Table 9.

At 1955, a second set of physical function routing tables can be generated based on the first set of virtual function routing tables and the second vPPU-pPPU mapping. For example, physical function routing tables mapping the communication links between the physical PPUs can be generated. In one implementation, the physical function routing tables can be stored in hardware registers. At 1960, in-use communication links for the second set of physical PPUs can be indicated in the second set of physical function routing tables. For example, in-use routing tables mapping the in-use communication links between the physical PPUs utilized by pPPU 0, pPPU 1, pPPU7 and pPPU6 can be generated as illustrated in Tables 14A, 14B, 14C and 14D respectively.

TABLE 14A

| pPPU 0 routing table | P-a | P-b | P-c | P-d | P-e | P-f | P-g |
|---|---|---|---|---|---|---|---|
| pPPU 0 | | | | | | | |
| pPPU 1 | | | | 10 | 11 | | |
| pPPU 7 | | | | | | | |
| pPPU 6 | 11 | 10 | | | | | |

As illustrated in Table 14A, a first bit position can indicate that pPPU 0 is coupled to pPPU 1 by communication links d and e, and to pPPU 6 by communication links a and b. A second bit position can indicate communication link e is in use for coupling pPPU 0 to pPPU 1, and communication link a is in use for coupled pPPU 0 to pPPU6.

TABLE 14B

| pPPU 1 routing table | P-a | P-b | P-c | P-d | P-e | P-f | P-g |
|---|---|---|---|---|---|---|---|
| pPPU 0 | | | | 10 | 11 | | |
| pPPU 1 | | | | | | | |
| pPPU 7 | 11 | 10 | | | | | |
| pPPU 6 | | | | | | | |

Table 14B indicates that indicates that pPPU 1 is coupled to pPPU 1 by communication links d and e, and to pPPU 7 by communication links a and b. Table 14B also indicates that pPPU 1 is coupled to pPPU 0 by in-use communication link e, and to pPPU 7 by in-use communication link a.

TABLE 14C

| pPPU 7 routing table | P-a | P-b | P-c | P-d | P-e | P-f | P-g |
|---|---|---|---|---|---|---|---|
| pPPU 0 | | | | | | | |
| pPPU 1 | 10 | 11 | | | | | |
| pPPU 7 | | | | | | | |
| pPPU 6 | | | | 10 | 11 | | |

Table 14C indicates that pPPU 7 is coupled to pPPU 1 by communication links a and b, and to pPPU 6 by communication links d and e. Table 14C also indicates that pPPU 7 is coupled to pPPU 1 by in-use communication link 3, and to pPPU 6 by in-use communication link e.

TABLE 14D

| pPPU 6 routing table | P-a | P-b | P-c | P-d | P-e | P-f | P-g |
|---|---|---|---|---|---|---|---|
| pPPU 0 | 11 | 10 | | | | | |
| pPPU 1 | | | | | | | |
| pPPU 7 | | | | 10 | 11 | | |
| pPPU 6 | | | | | | | |

Table 14D indicates that pPPU 6 is coupled to pPPU 7 by communication links d and e, and to pPPU 0 by communication links a and b. Table 14D also indicates that pPPU 6 is coupled to pPPU 7 by in-use communication link e, and to pPPU 0 by in-use communication link 1. In one implementation, the physical function routing tables including in-use communication link information can be stored in hardware registers or the physical hub (PHUB)/switch of the hardware for the plurality of PPUs.

At 1965, the software of the source VF can be copied to a destination VF. In one implementation, the program of the source VF on the current virtual PPU topology can be copied to the destination VF on the new virtual PPU topology. At 1970, status information and data from the first set of physical PPUs can be migrated to the second set of physical PPUs based on the first vPPU-pPPU mapping and the second vPPU-pPPU mapping. During runtime, the VF/PF drivers can utilize the second vPPU-pPPU mapping and second set of physical function n routing tables including the in-use communication link indications for execution on the PPU partition, at 1975.

Figure 20:
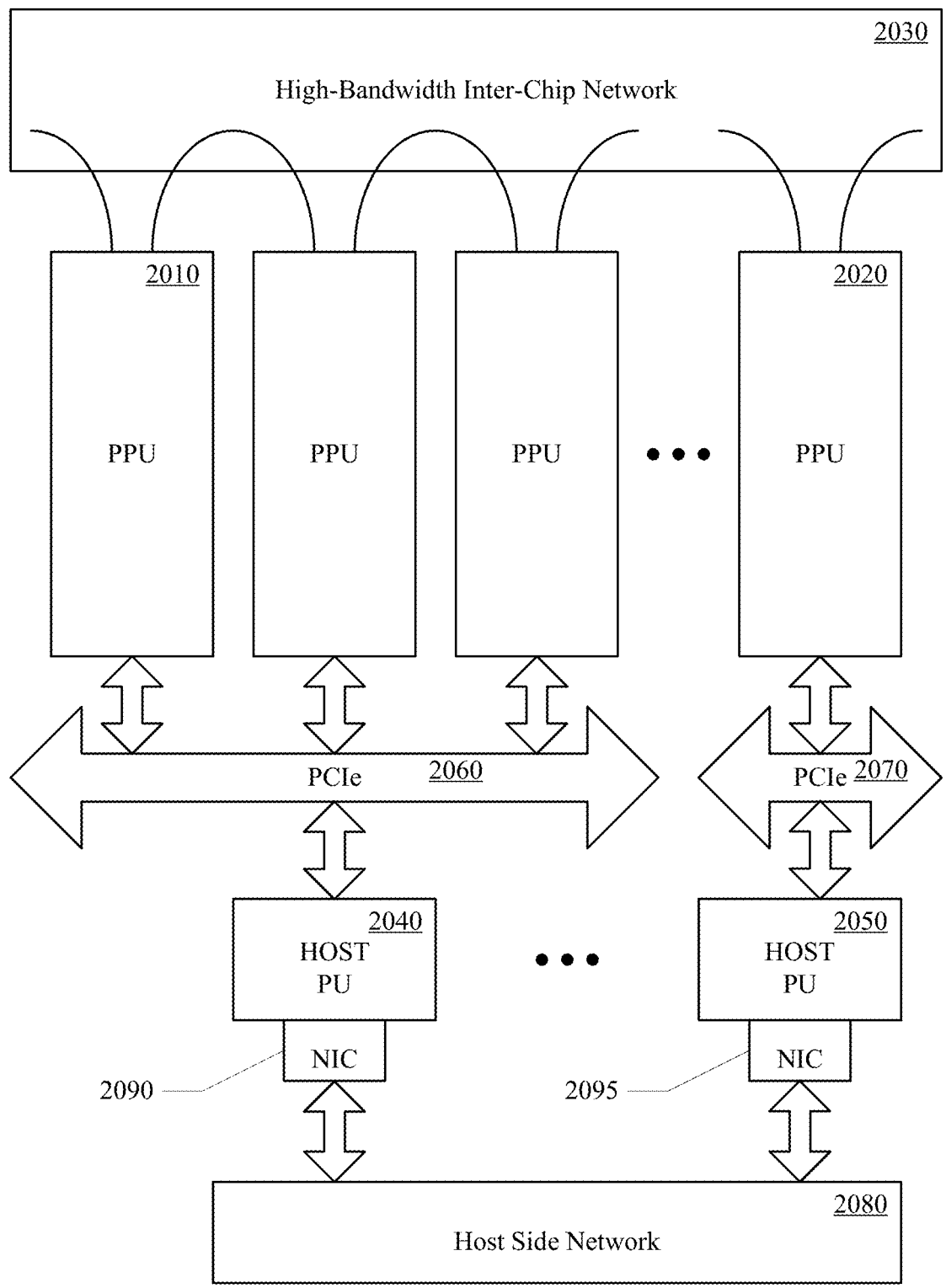
FIG. 20 shows an exemplary computing system including a plurality of parallel processing units (PPUs), in accordance with aspects of the present technology.

Referring now to FIG. 20, an exemplary computing system including a plurality of PPUs, in accordance with aspects of the present technology, is shown. The exemplary computer system 2000 can include a plurality of PPUs 2010, 2020 coupled together by one or more high-bandwidth inter-chip networks 2030. The plurality of PPUs 2010, 2020 can be, but are not limited to, a plurality of neural processing accelerators. The PPUs 2010-2020 can also be coupled to a plurality of host processing units 2040, 2050 by one or more communication busses 2060, 2070. The one or more communications busses 2060, 2070 can be, but are not limited to, one or more peripheral component interface express (PCIe) busses. The one or more host processing units 2040, 2050 can be coupled to one or more host side networks 2080 by one or more network interface cards (NICs) 2090, 2095.

Figure 21:
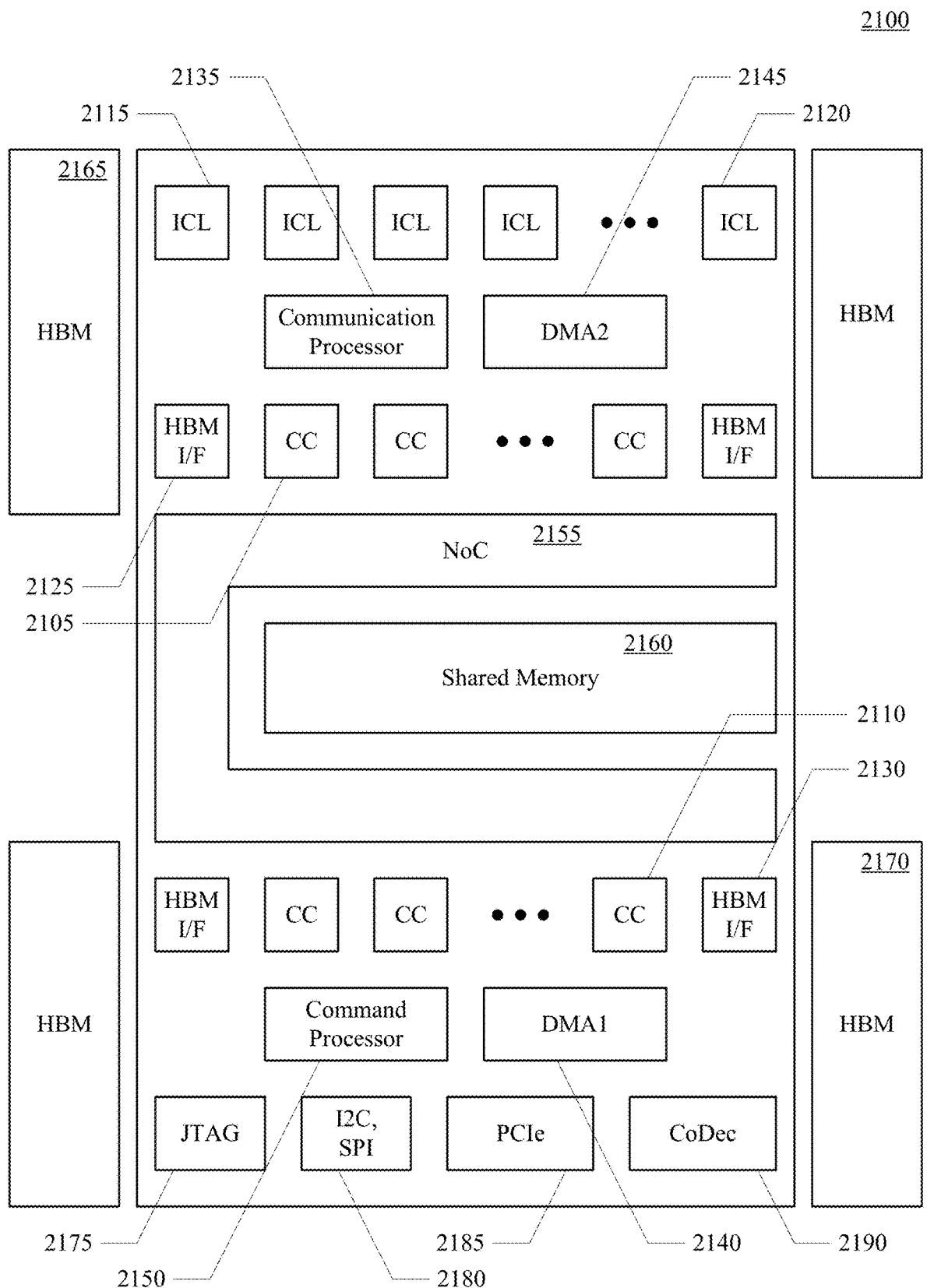
FIG. 21 shows an exemplary parallel processing unit (PPU), in accordance with aspects of the present technology.

Referring now to FIG. 21, an exemplary PPU, in accordance with aspects of the present technology, is shown. The PPU 2100 can include a plurality of compute cores 2105, 2110, a plurality of inter-chip links (ICL) 2115, 2120, one or more high-bandwidth memory interfaces (HBM I/F) 2125, 2130, one or more communication processors 2135, one or more direct memory access (DMA) controllers 2140, 2145, one or more command processors (CP) 2150, one or more networks-on-chips (NoCs) 2155, shared memory 2160, and one or more high-bandwidth memory (HBM) 2165, 2170. The PPU 2100 can also include one or more joint test action group (JTAG) engines 2175, one or more inter-integrated circuit (I²C) interfaces and or serial peripheral interfaces (SPI) 2180, one or more peripheral component interface express (PCIe) interfaces 2185, one or more codecs (CoDec) 2190, and the like. In one implementation, the plurality of compute cores 2105, 2110, the plurality of inter-chip links (ICL) 2115, 2120, one or more high-bandwidth memory interfaces (HBM I/F) 2125, 2130, one or more communication processors 2135, one or more direct memory access (DMA) controllers 2140, 2145, one or more command processors (CP) 2150, one or more networks-on-chips (NoCs) 2155, shared memory 2160, one or more high-bandwidth memory (HBM) 2165, 2170, one or more joint test action group (JTAG) engines 2175, one or more inter-integrated circuit (I²C) interfaces and or serial peripheral interfaces (SPI) 2180, one or more peripheral component interface express (PCIe) interfaces 2185, one or more codecs (CoDec) 2190, and the like can be fabricated in one monolithic integrated circuits (ICs)

The ICLs 2115, 2120 can be configured for chip-to-chip communication between a plurality of PPUs. In one implementation, the PPU 2100 can include seven ICLs 2115, 2120. The communication processor 2135 and direct memory access engines 2140, 2145 can be configured to coordinate data sent and received through the ICLs 2115, 2120. The network-on-chip (NoC) 2155 can be configured to coordinate data movement between the compute cores 2105, 2110 and the shared memory 2160. The communication processor 2135, direct memory access engines 2140, 2145, network on chip 2155 and high-bandwidth memory interfaces (HBM I/F) 2125, 2130 can be configured to coordinate movement of data between the high-bandwidth memory 2165, 2170, the shared memory 2160 and the ICLs 2115, 2120. The command processor 2150 can be configured to serve as an interface between the PPU 2100 and one or more host processing units. The plurality of the PPUs 2100 can advantageously be employed for virtualization and migration of compute functions as described above with reference to FIGS. 6-13, 14A-14B, 15-17, 18A-18B, and 19A-19B.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A parallel processing virtualization method comprising:
   determining virtual parallel processing units utilized by a virtual function;
   determining virtual function routing tables for the virtual parallel processing units from a logical topology of the virtual function;
   mapping the virtual parallel processing units to a first set of physical parallel processing units; and
   generating a first set of physical function routing tables for the first set of physical parallel processing units based on the virtual function routing tables and the mapping of the virtual parallel processing units to the first set of physical parallel processing units.

2. The parallel processing virtualization method according to claim 1, further comprising: generating a first set of in-use communication link routing tables for the first set of physical parallel processing units from the logical topology of the virtual function.

3. The parallel processing virtualization method according to claim 2, further comprising:
   executing an application on the first set of physical parallel processing units using the mapping of the virtual parallel processing units to the first set of physical parallel processing units, the first set of physical function routing tables and the first set of in-use communication link routing tables.

4. The parallel processing virtualization method according to claim 1, further comprising:
   receiving a migration event;
   mapping the virtual parallel processing units to a second set of physical parallel processing units;
   generating second set of physical function routing tables for the second set of physical parallel processing units based on the virtual function routing tables and the mapping of the virtual parallel processing units to the second set of physical parallel processing units; and
   migrating data from the first set of physical parallel processing units to the second set of physical parallel processing units based on the mapping of the virtual parallel processing units to the first set of physical parallel processing units and the mapping of the virtual parallel processing units to the second set of physical parallel processing units.

5. The parallel processing virtualization method according to claim 4, further comprising: generating a second set of in-use communication link routing tables for the second set of physical parallel processing units from the logical topology of the virtual function.

6. The parallel processing virtualization method according to claim 5, further comprising:
executing an application on the second set of physical parallel processing units using the mapping of the virtual parallel processing units to the second set of physical parallel processing units, the second set of physical function routing tables and the second set of in-use communication link routing tables.

7. The parallel processing virtualization method according to claim 1, wherein a plurality of parallel processing units is organized into a plurality of subsets of parallel processing units, wherein each parallel processing unit in each subset is coupled to each of the other parallel processing units in the same subset of parallel processing units by two bi-directional communication links, and each parallel processing unit is coupled to a corresponding parallel processing unit of a corresponding other of the subset of parallel processing units by one bi-directional communication link.

8. The parallel processing virtualization method according to claim 1, wherein:
a plurality of parallel processing units comprises eight parallel processing units;
the plurality of parallel processing units is organized into two subsets of four parallel processing units each;
two bi-directional communication links couple each parallel processing unit to the other three parallel processing units in the same subset of parallel processing units; and
one bi-directional communication link couples each parallel processing unit to a corresponding parallel processing unit is the other subset of parallel processing units.

9. A parallel processing virtualization method comprising:
determining virtual parallel processing units utilized by a virtual function;
determining virtual function routing tables for the virtual parallel processing units from a logical topology of the virtual function;
identifying a first partition of a plurality of physical parallel processing units;
mapping the virtual parallel processing units to a first set of physical parallel processing units in the first partition; and
generating a first set of physical function routing tables including indications of in-use communication links for the first set of physical parallel processing units based on the virtual function routing tables and the mapping of the virtual parallel processing units to the first set of physical parallel processing units.

10. The parallel processing virtualization method according to claim 9, further comprising:
executing an application on the first set of physical parallel processing units using the mapping of the virtual parallel processing units to the first set of physical parallel processing units, and the first set of physical function routing tables including indications of in-use communication links.

11. The parallel processing virtualization method according to claim 9, further comprising:
receiving a migration event;
identifying a second partition of a plurality of parallel processing units;
mapping the virtual parallel processing units to a second set of physical parallel processing units in the second partition;
generating second set of physical function routing tables including indication of in-use communication links for the second set of physical parallel processing units based on the virtual function routing tables and the mapping of the virtual parallel processing units to the second set of physical parallel processing units; and
migrating data from the first set of physical parallel processing units to the second set of physical parallel processing units based on the mapping of the virtual parallel processing units to the first set of physical parallel processing units and the mapping of the virtual parallel processing units to the second set of physical parallel processing units.

12. The parallel processing virtualization method according to claim 11, further comprising:
executing an application on the second set of physical parallel processing units using the mapping of the virtual parallel processing units to the second set of physical parallel processing units, and the second set of physical function routing tables including indications of in-use communication links.

13. The parallel processing virtualization method according to claim 11, further comprising:
copying a source virtual function drive to a destination source function driver.

14. The parallel processing virtualization method according to claim 11, wherein the mapping of the virtual parallel processing units to the first set of physical parallel processing units and the mapping of the virtual parallel processing units to the second set of physical parallel processing units are exposed to a virtual function driver.

15. The parallel processing virtualization method according to claim 11, wherein virtual function routing tables are stored in a system memory.

16. The parallel processing virtualization method according to claim 11, wherein:
a memory space partition of an application executing on the first set of physical parallel processing units is associated with identifiers of the virtual parallel processing units.

17. The parallel processing virtualization method according to claim 11, wherein the first set of physical parallel processing units and the second set of physical parallel processing unit are in the same plurality of physical parallel processing units.

18. The parallel processing virtualization method according to claim 11, wherein the first set of physical parallel processing units and the second set of physical parallel processing unit are different pluralities of physical parallel processing units.

19. The parallel processing virtualization method according to claim 11, wherein the first set of physical parallel processing units and the second set of physical parallel processing unit are in a same system having a same configuration, a same topology or a different topology.

20. The parallel processing virtualization method according to claim 11, wherein the first set of physical parallel processing units and the second set of physical parallel processing unit are in respective compatible systems.

* * * * *